United States Patent
Takaki

(10) Patent No.: US 10,539,659 B2
(45) Date of Patent: Jan. 21, 2020

(54) APPARATUS FOR DETECTING AXIAL MISALIGNMENT

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 304 days.

(21) Appl. No.: 15/506,396

(22) PCT Filed: Aug. 27, 2015

(86) PCT No.: PCT/JP2015/074249
§ 371 (c)(1),
(2) Date: Feb. 24, 2017

(87) PCT Pub. No.: WO2016/031918
PCT Pub. Date: Mar. 3, 2016

(65) Prior Publication Data
US 2017/0254881 A1 Sep. 7, 2017

(30) Foreign Application Priority Data

Aug. 27, 2014 (JP) .................................. 2014-173074

(51) Int. Cl.
*G01S 13/86* (2006.01)
*G01S 7/40* (2006.01)
*G01S 13/93* (2006.01)

(52) U.S. Cl.
CPC .......... *G01S 7/4026* (2013.01); *G01S 13/867* (2013.01); *G01S 13/931* (2013.01);
(Continued)

(58) Field of Classification Search
CPC ................. G01S 13/867; G01S 13/931; G01S 2007/403; G01S 2007/4034; G01S 2013/9375; G01S 7/4026
(Continued)

(56) References Cited

U.S. PATENT DOCUMENTS 5,325,096 A 6/1994 Pakett
5,517,196 A 5/1996 Pakett et al.
(Continued)

FOREIGN PATENT DOCUMENTS

CN 102679953 A 9/2012
JP 2002-174684 6/2002
(Continued)

*Primary Examiner* — Timothy A Brainard
(74) *Attorney, Agent, or Firm* — Knobbe, Martens, Olson & Bear, LLP

(57) ABSTRACT

A diagnostic apparatus includes an obtaining unit for obtaining horizontal misalignment information indicative of whether there is horizontal misalignment in a probing beam. The diagnostic apparatus includes a diagnostic unit for diagnosing whether there is vertical misalignment. The vertical misalignment is misalignment of the probing beam with respect to a designed beam axis position in a vertical direction. The vertical direction corresponds to a height direction of the vehicle. The diagnostic apparatus includes a determining unit for determining, based on the horizontal misalignment information, whether the diagnostic unit executes diagnosis of the vertical misalignment. The determining unit causes the diagnostic unit to execute diagnosis of the vertical misalignment upon the horizontal misalignment information representing that there is no horizontal misalignment. The determining unit disables the diagnostic unit from executing diagnosis of the vertical misalignment upon the horizontal misalignment information representing that there is horizontal misalignment.

8 Claims, 14 Drawing Sheets

(52) U.S. Cl.
CPC . *G01S 2007/403* (2013.01); *G01S 2007/4034* (2013.01); *G01S 2013/9375* (2013.01)

(58) Field of Classification Search
USPC .......................................................... 342/52
See application file for complete search history.

(56) References Cited

U.S. PATENT DOCUMENTS

| | | |
|---|---|---|
| 2006/0077052 A1 | 4/2006 | Matsuoka |
| 2012/0235851 A1* | 9/2012 | Park ..................... G01S 7/4026 342/70 |
| 2016/0349356 A1 | 12/2016 | Takaki |

FOREIGN PATENT DOCUMENTS

| | | |
|---|---|---|
| JP | 2002-174684 A | 6/2002 |
| JP | 2004-085258 | 3/2004 |
| JP | 2004-205398 A | 7/2004 |
| JP | 2008-215912 | 9/2008 |
| JP | 2008-215912 A | 9/2008 |

* cited by examiner

FIG. 3
PREDETERMINED POSITION
IN HORIZONTAL DIRECTION
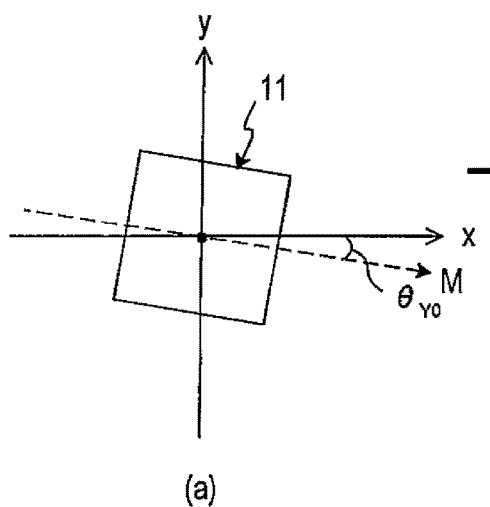
(a)
MISALIGNMENT
IN HORIZONTAL DIRECTION
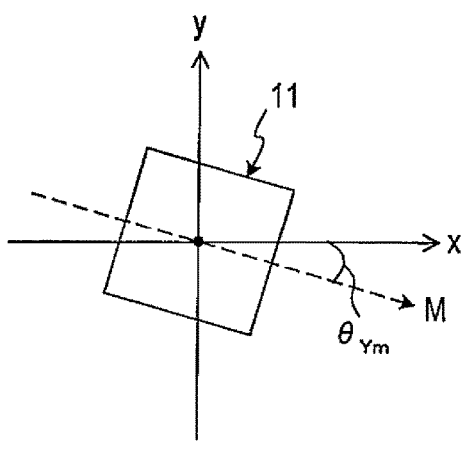
(b)
PREDETERMINED POSITION
IN VERTICAL DIRECTION
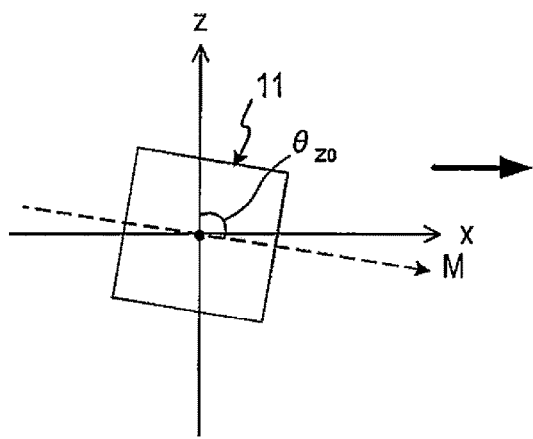
(c)
MISALIGNMENT
IN VERTICAL DIRECTION
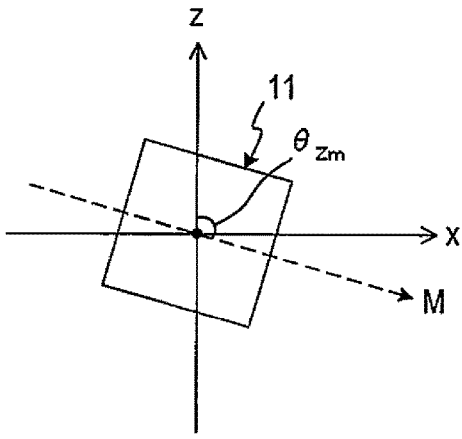
(d)

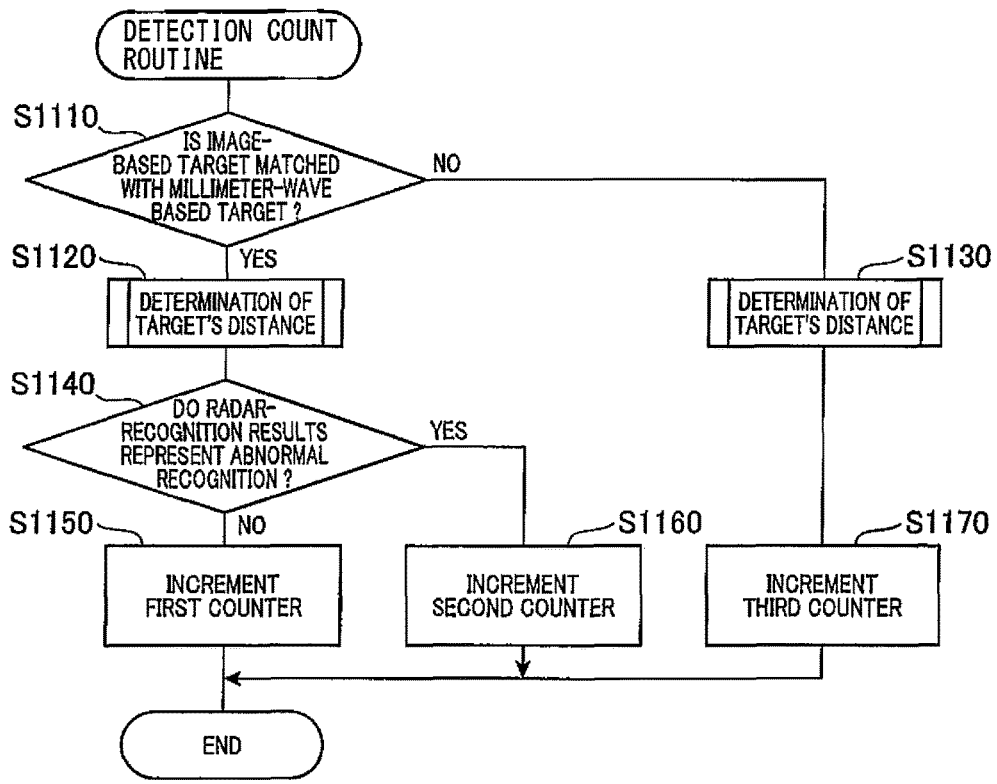

VERTICAL MISALIGNMENT-QUANTITY CALCULATION

| INPUT 1 | TARGET PAIR-RECOGNITION PERCENTAGE | X% |
|---|---|---|
| INPUT 2 | ABNORMAL-RECOGNITION PERCENTAGE | Y% |
| OUTPUT | VERTICAL MISALIGNMENT ESTIMATION | $-\alpha$ deg |

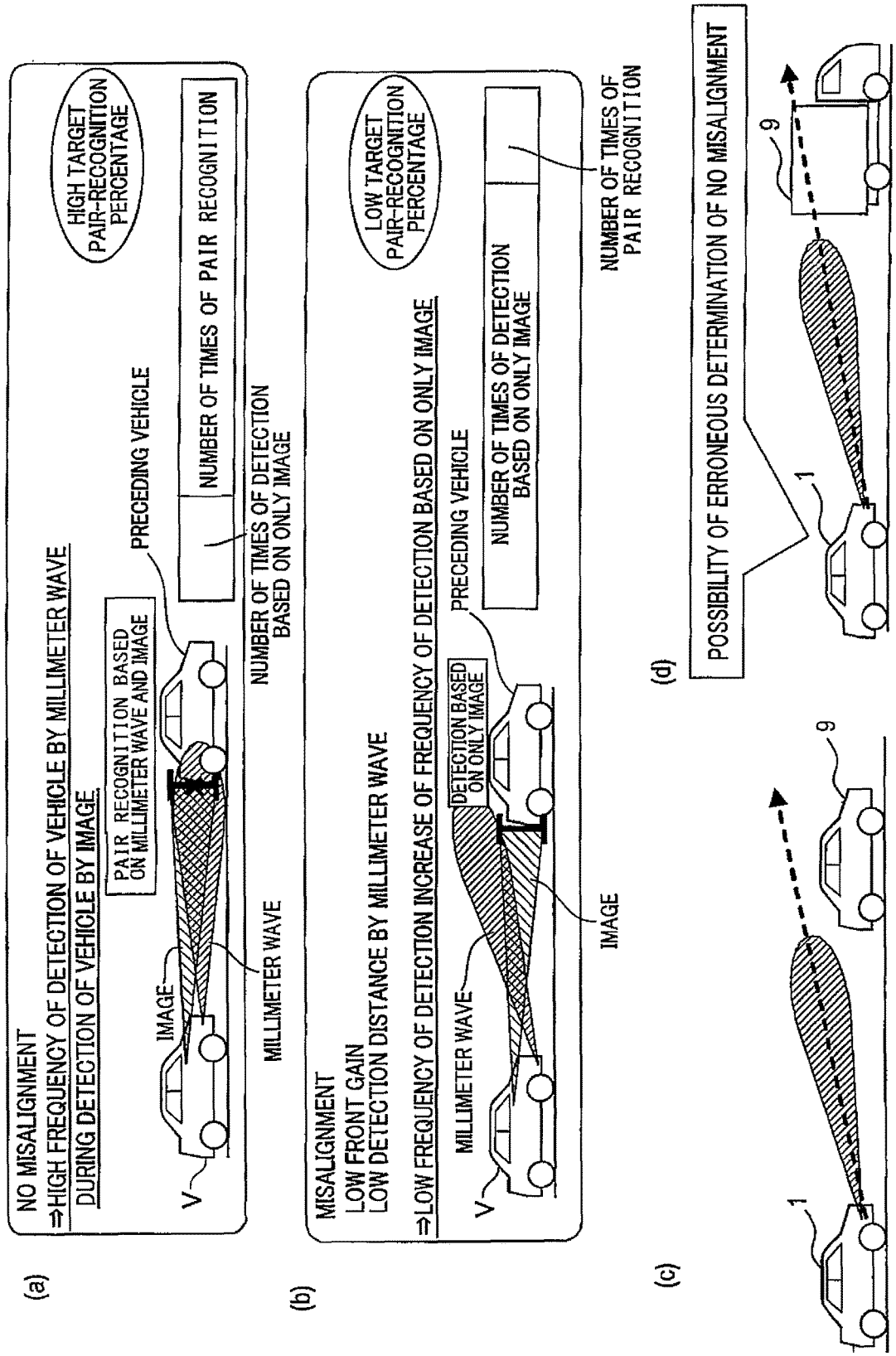

DISTANCE DETERMINATION

| [INPUT] DISTANCE [m] | [OUTPUT] DISTANCE INDEX |
| --- | --- |
| 0–10m | 1 |
| 10–20m | 2 |
| 20–30m | 3 |
| 30–40m | 4 |
| 40–50m | 5 |
| 50–60m | 6 |
| 60–70m | 7 |
| 70–80m | 8 |
| 80–90m | 9 |
| 90–100m | 10 |
| 100m– | 11 |

(a)  (b)

APPARATUS FOR DETECTING AXIAL MISALIGNMENT

TECHNICAL FIELD

The present disclosure relates to technologies for detecting axial misalignment of a beam sensor installable to vehicles. Note that the axial misalignment of a beam sensor represents displacement of a reference axis of a beam output from the beam sensor in its travelling direction with respect to a previously designed axis position; the reference axis of a beam sensor is referred to as a beam axis of the beam sensor.

BACKGROUND ART

Beam sensors are usually used in order to perform various types of control for improving the running safety of vehicles. Such a beam sensor transmits probing beams, such as laser beams, ultrasonic waves, or millimeter waves, and receives reflection beams, thus detecting targets located around a vehicle.

Such a beam sensor is mounted to a predetermined mount position of a vehicle while the beam axis is aligned with a previously designed axis position such that each probing beam is irradiated within a predetermined irradiation range. For this reason, if any factor causes the mounted position of the beam sensor to be deviated from the predetermined mount position, the beam axis may be deviated from the previously designed axis position. This may result in radar waves being out of the predetermined irradiation range. This may deteriorate the detection accuracy of targets to be detected by the beam sensor, deteriorating the accuracy of the various types of control for improving the running safety of the vehicle.

Note that such axial misalignment of the beam axis relative to a previously designed axis position will also be referred to merely as axial misalignment. In addition, axial misalignment in a vertical plane including the beam axis will be referred to as vertical misalignment, and axial misalignment in a horizontal plane including the beam axis will also be referred to as horizontal misalignment.

In view of these circumstances, technologies are proposed for detecting axial misalignment of beam sensors.

For example, a technology disclosed in patent document detects a vanishing point in accordance with an image captured while a vehicle to which a laser beam sensor is installed is running.

Then, during adjustment of the laser beam axis, i.e. while the vehicle is stopped, the technology detects, based on the detected vanishing point and the transmitting direction of a laser beam, the difference between the transmitting direction of the laser beam and the forward direction of the vehicle, and corrects the transmitting direction of the laser beam accordingly.

CITATION LIST

Patent Document

[Patent Document 1] Japanese Patent Application Publication No. 2004-205398

SUMMARY OF INVENTION

Technical Problem

The technology disclosed in patent document 1 is capable of correcting the transmitting direction of the laser beam in accordance with the vanishing point that is detected based on the image captured while the vehicle to which the laser beam sensor is installed is running. Unfortunately, the technology performs the correction of the transmitting direction of the laser beam during adjustment of the laser beam axis, i.e. while the vehicle is stopped. Thus, the technology may result in a difficulty in detection of axial misalignment of the radar beam sensor while the corresponding vehicle is running.

The present disclosure has been created in view of such a problem. For example, a first object of the present disclosure is to provide technologies, each of which is capable of detecting axial misalignment of a beam sensor, which is installable to a vehicle, while the vehicle is running.

In addition, a second object of the present disclosure is to improve the accuracy of detecting axial misalignment of the beam axis of a beam sensor installable to vehicles.

Means for Solving Problem

There is provided a diagnostic apparatus of a beam sensor installed in a vehicle. The beam sensor transmits a probing beam and receives a reflected beam based on the probing beam. The diagnostic apparatus includes an obtaining unit for obtaining horizontal misalignment information indicative of whether there is horizontal misalignment, the horizontal misalignment being misalignment of the probing beam with respect to a designed beam axis position in a horizontal direction. The horizontal direction corresponds to a width direction of the vehicle. The diagnostic apparatus includes a diagnostic unit for diagnosing whether there is vertical misalignment. The vertical misalignment is misalignment of the probing beam with respect to a designed beam axis position in a vertical direction. The vertical direction corresponds to a height direction of the vehicle. The diagnostic apparatus includes a determining unit for (1) Determining, based on the horizontal misalignment information, whether the diagnostic unit executes diagnosis of the vertical misalignment (2) Causing the diagnostic unit to execute diagnosis of the vertical misalignment upon the horizontal misalignment information representing that there is no horizontal misalignment (3) Disable the diagnostic unit from executing diagnosis of the vertical misalignment upon the horizontal misalignment information representing that there is horizontal misalignment.

The diagnostic apparatus is configured to disable execution of diagnosis of the vertical misalignment when there is misalignment of the probing beam in the horizontal direction. This configuration prevents the state where there is horizontal misalignment from being erroneously detected as the state where there is vertical misalignment. That is, this configuration reduces erroneous detection of vertical misalignment of the beam axis of the beam sensor.

Note that bracketed reference numerals in the claims represent correspondence relationship with respect to specific means described in the following embodiments as an example, and therefore do not restrict the scope of the present invention.

BRIEF DESCRIPTION OF DRAWINGS

FIG. 3 is an explanatory view for describing misalignment of the radar sensor illustrated in FIG. 1 in a horizontal direction, and misalignment of the radar sensor in a vertical direction;

FIG. 8A is a flowchart schematically illustrating a detection count routine in the vertical misalignment diagnostic routine;

FIG. 8B is a diagram illustrating a distance determination table used by the detection count routine;

FIG. 12 is a diagram illustrating advantageous effects of the vertical misalignment diagnostic routine according to the first embodiment, and illustrating a detection count routine according to the third embodiment;

DESCRIPTION OF EMBODIMENTS

The following describes the embodiments of the present invention with reference to the accompanying drawings.

1. First Embodiment

1-1. Structure

Figure 1:
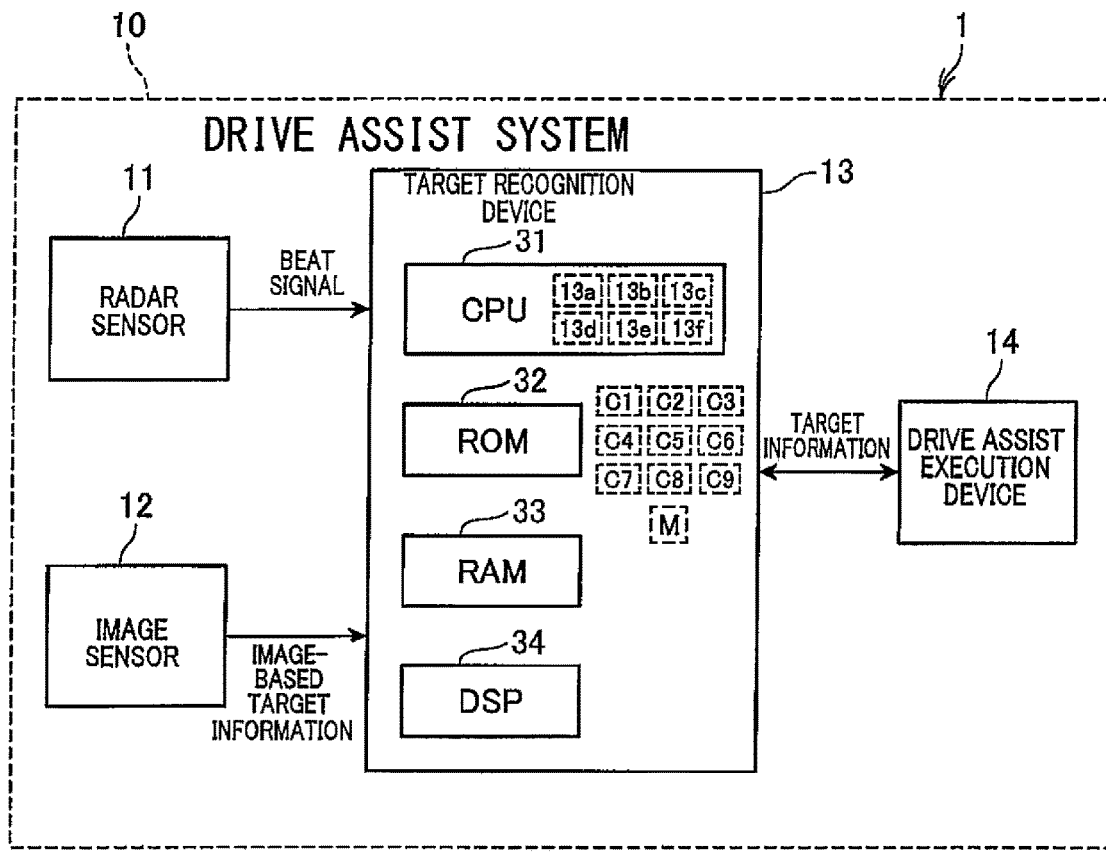
FIG. 1 is a block diagram illustrating an example of the structure of a drive assist system according to the first embodiment of the present disclosure.

Referring to FIG. 1, a drive assist system 1 according to the first embodiment includes a radar sensor 11, an image sensor 12, a target recognition device 13, and a drive-assist execution device 14. The drive assist system 1 is installed in a vehicle V.

The target recognition device 13 is communicably connected to the radar sensor 11, the image sensor 12, and the drive-assist execution device 14.

Figure 2:
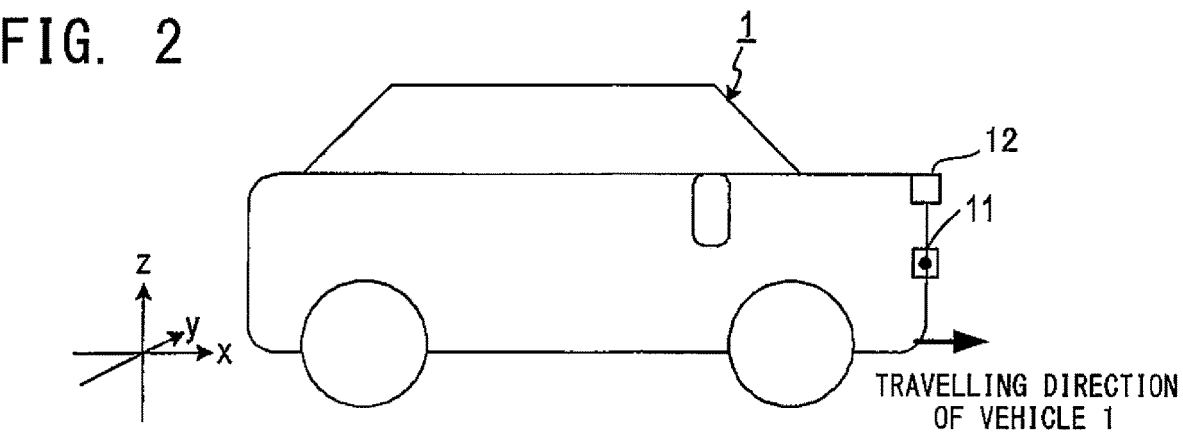
FIG. 2 is a view illustrating where a radar sensor illustrated in FIG. 1 is mounted to a vehicle.

Referring to FIG. 2, the radar sensor 11 is mounted to a predetermined position of the front end of the own vehicle 1. Specifically, the radar sensor 11 is mounted such that the center axis, i.e. radar axis, of its detection range has a predetermined angle with respect to each of the front-rear direction and the vertical direction of the own vehicle 1. The front-rear direction is the longitudinal direction of the own vehicle 1 corresponding to the X direction in FIG. 2, and the vertical direction is the vehicle height direction corresponding to the Z direction in FIG. 2; the vertical direction is perpendicular to the X direction and a Y direction corresponding to the vehicle width direction illustrated in FIG. 2.

Reference characters (a) and (c) of FIG. 3 illustrate an example of the mount structure. Specifically, the radar sensor 11 is mounted such that (1) The center axis M of the detection range has a predetermined angle $\theta_{Y0}$ relative to a predetermined direction, for example, the direction of the X-axis, in the vehicle width direction along the X-Y plane, i.e. a horizontal plane, of the own vehicle (2) The radar sensor 11 is mounted such that the center axis M of the detection range has a predetermined angle $\theta_{Z0}$ relative to a predetermined direction, for example, the direction of the Z-axis, in the vehicle width direction along the X-Z plane, i.e. a vertical plane, of the own vehicle.

Hereinafter, the following state in which the angle, referred to as $\theta_{Ym}$, formed between the center axis M of the detection range and the predetermined direction, i.e. the X axis, in the vehicle width direction along the X-Y plane deviates from the predetermined angle $\theta_{Y0}$ is referred to as a state in which axial misalignment in the horizontal direction has occurred (see reference character (b) in FIG. 3 as an example).

Similarly, the following state in which the angle, referred to as $\theta_{Zm}$, formed between the center axis M of the probing range and the predetermined direction, i.e. the Z axis, in the vehicle height direction along the Z-X plane deviates from the predetermined angle $\theta_{Z0}$ is referred to as a state in which axial misalignment in the vertical direction has occurred (see reference character (d) in FIG. 3 as an example).

The radar sensor 11 irradiates radar waves, i.e. radar beams, toward a first probing region established in front of the own vehicle 1, and receives echoes, i.e. reflected beams, based on the irradiated radar beams. For example, the radar sensor 11 and the target recognition device 13 constitute a known Frequency Modulated Continuous Wave (FMCW) radar that detects targets within the first probing region using millimeter waves.

Specifically, as illustrated in FIG. 2, the radar sensor 11 is disposed to, for example, the center of the front head of the vehicle 1. The radar sensor 11 transmits, toward the first probing range via a transmitting antenna, a transmitting wave, i.e. a transmitting beam, whose frequency linearly rises, i.e. is modulated upward, and linearly falls, i.e. is modulated downward. The radar sensor 11 receives, via a receiving antenna, a radar wave, i.e. a reflected beam, reflected by a target in front of the radar sensor 11. Then, the radar sensor 11 mixes the transmitting beam with the received beam to thereby extract a beat signal having a beat frequency matching with the distance R and relative velocity V between the radar sensor 11 and the target.

For example, at least one of the transmitting antenna and the receiving antenna of the radar sensor 11 is comprised of an array of antennas. Note that the combination of the transmitting antenna and the receiving antenna, at least one of which is comprised of the array of antennas will be referred to as channels. The radar sensor 11 is operative to extract a beat signal for each of the channels. The radar sensor 11 causes an AD converter to convert the extracted analog beat signal to a digital beat signal, and outputs the digital beat signal to the target recognition device 13. The output beat signals are input to the target recognition device 13.

Referring to FIG. 2, the image sensor 12 is comprised of, for example, a CCD camera disposed to, for example, the front head of the vehicle V and located above the radar sensor 11. The CCD camera captures images in a second probing region established around the own vehicle 1, i.e. established in front of the own vehicle 1 according to the first embodiment.

Figure 4:
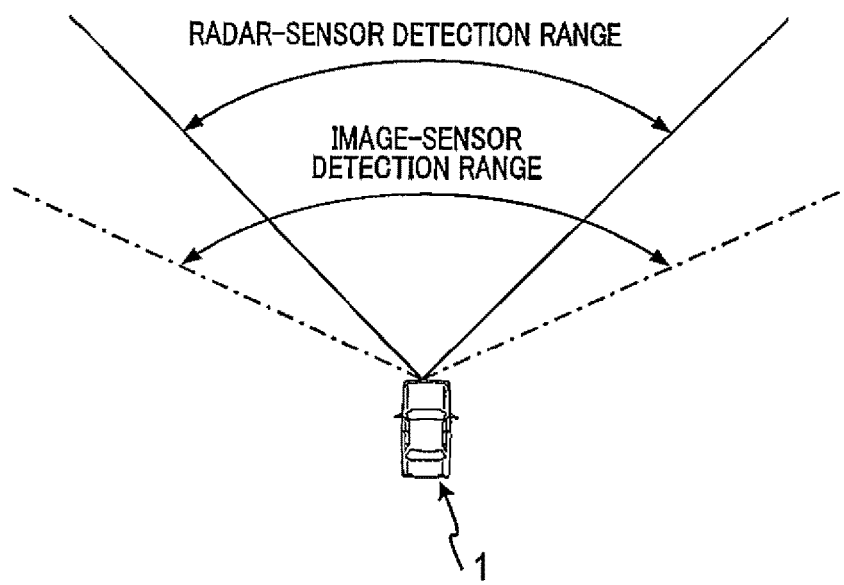
FIG. 4 is an explanatory view for describing the detection ranges of the respective radar sensor and image sensor illustrated in FIG. 1.

The detecting range of the CCD camera has a predetermined angular range wider than that of the detection range of the radar sensor 11 (see FIG. 4).

Specifically, as illustrated in FIG. 4, the first probing range, i.e. first detection region, of the radar sensor 11 is a region expanding, in the form of a sector shape, to have a predetermined angle of view in the horizontal direction, i.e. the vehicle width direction of the vehicle 1, while centering on the beam axis of the radar beam.

Additionally, the second probing range, i.e. second detection region, of the image sensor 12 is a region expanding, in the form of a sector shape, to have a predetermined angle of view in the horizontal direction, i.e. the vehicle width direction, while centering on the optical axis of the image sensor 12. Note that, as illustrated in FIG. 4, the beam axis of the radar sensor 11 is in agreement with the optical axis of the image sensor 12 when viewed from above the vehicle 1 as illustrated in FIG. 4.

In addition, the first probing region, i.e. first detection region, of the radar sensor 11 expands, in the form of a sector shape, to have a predetermined angle of view in the vertical direction, i.e. the height direction of the vehicle 1, while centering on the beam axis of the radar beam. Additionally, the second probing region, i.e. second detection region, of the image sensor 12 expands, in the form of a sector shape, to have a predetermined angle of view in the vertical direction, i.e. the height direction, while centering on the optical axis of the image sensor 12 (see (a) of FIG. 12).

This results in the first probing region and the second probing region being at least partly overlap one another.

The image sensor 12 performs known image-processing tasks, such as template matching, with respect to image data captured by the CCD camera, thus detecting predetermined targets, such as vehicles or pedestrians located in the corresponding detection range.

The image sensor 12 also transmits, to the target recognition device 13, information indicative of at least one target, which is referred to as an image-based target, detected by the image-processing tasks as image-based target information. The image-based target information includes at least the type, size, position, such as distance and orientation, of the image-based target.

The target recognition device 13 is comprised of a microcomputer including, for example, a CPU 31, a ROM 32, and a RAM 33. The target recognition device 13 also includes a digital signal processor (DSP) 34 for executing signal processing, such as fast Fourier transform (FFT).

The CPU 31 of the target recognition device 13 serves as a beam recognition unit 13a for recognizing, in accordance with the beat signal(s) obtained from the radar sensor 11, one or more targets located within the first probing region, thus generating target information to be supplied to the drive assist execution device 14 accordingly. The CPU 31 of the target recognition device 13 also serves as an image recognition unit 13a for recognizing, in accordance with the image-based target information obtained from the image sensor 12, one or more targets located within the second probing region, thus generating target information to be supplied to the drive assist execution device 14 accordingly. Detailed descriptions of how to recognize one or more targets based on the above target recognition operations are omitted, because how to recognize one or more targets based on the above target recognition operations is a wall-known technology.

The CPU 13 of the target recognition device 13 serves as a diagnosis processor for performing a radar misalignment diagnostic task that determines whether there is axial misalignment in the radar sensor 11.

The drive-assist execution device 14 controls various in-vehicle devices in accordance with the recognition results, i.e. target information, obtained by the target recognition device 13 to perform predetermined drive assist accordingly. The drive-assist execution device 14 includes at least a monitor and/or a speaker as the in-vehicle devices that the drive-assist execution device 14 controls. The monitor is operative to display various images, and the speaker is operative to output audible alarms and guide messages. The drive-assist execution device 14 can include various control units for controlling an internal combustion engine, a powertrain mechanism, and a brake mechanism installed in the own vehicle.

1-2. Routine 1-2-1. Radar Misalignment Diagnostic Routine

Figure 5:
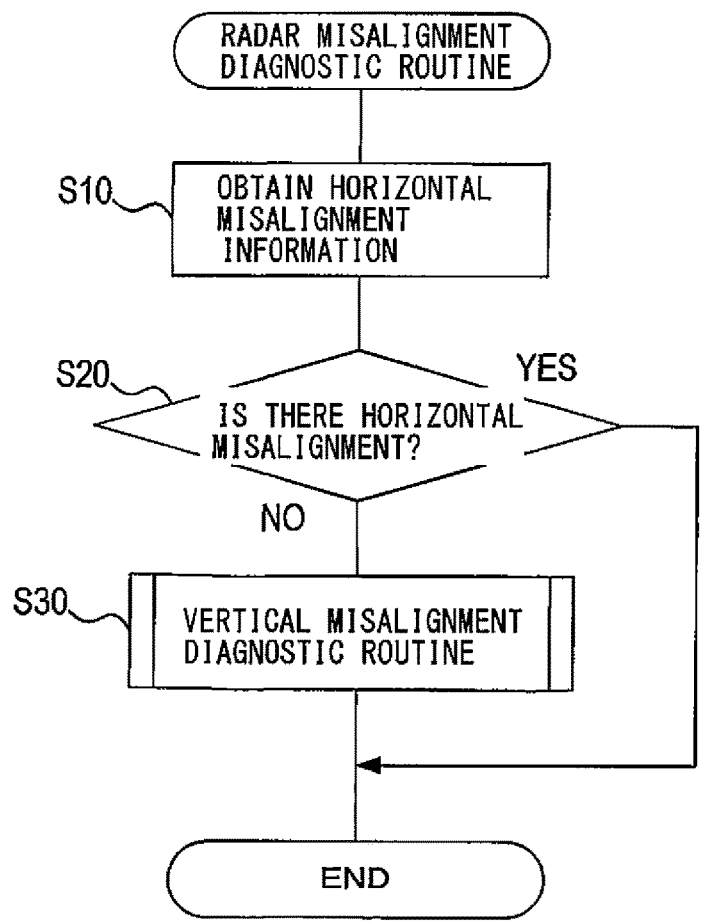
FIG. 5 is a flowchart schematically illustrating a misalignment diagnostic routine according to the first embodiment of the present disclosure.

Next, the following describes the radar misalignment diagnostic routine carried out by the target recognition device 13, i.e. its CPU 13, with reference to the flowchart of FIG. 5.

For example, the target recognition device 13 repeatedly executes the radar misalignment diagnostic routine while cruise control is carried out by the drive-assist execution device 14 based on the recognition results, i.e. target information, obtained by the target recognition device 13 with an auto cruise switch (ACC) switch on. The cruise control is control that automatically controls the speed of the own vehicle 1 as a function of the distance between the own vehicle 1 and a preceding vehicle.

First, the target recognition device 13 obtains horizontal misalignment information indicative of whether there is misalignment in the horizontal direction in the radar sensor 11 in step S10. The operation in step S10 by the CPU 31 or a hardware structure that carries out the operation in step S10 serves as, for example, an obtaining means 13c.

As an example, the target recognition device 13 according to the first embodiment performs a horizontal misalignment diagnostic routine, which is a separate routine from the radar misalignment diagnostic routine; the horizontal misalignment diagnostic routine determines whether there is horizontal misalignment in the horizontal direction in the radar sensor 11.

Figure 6:
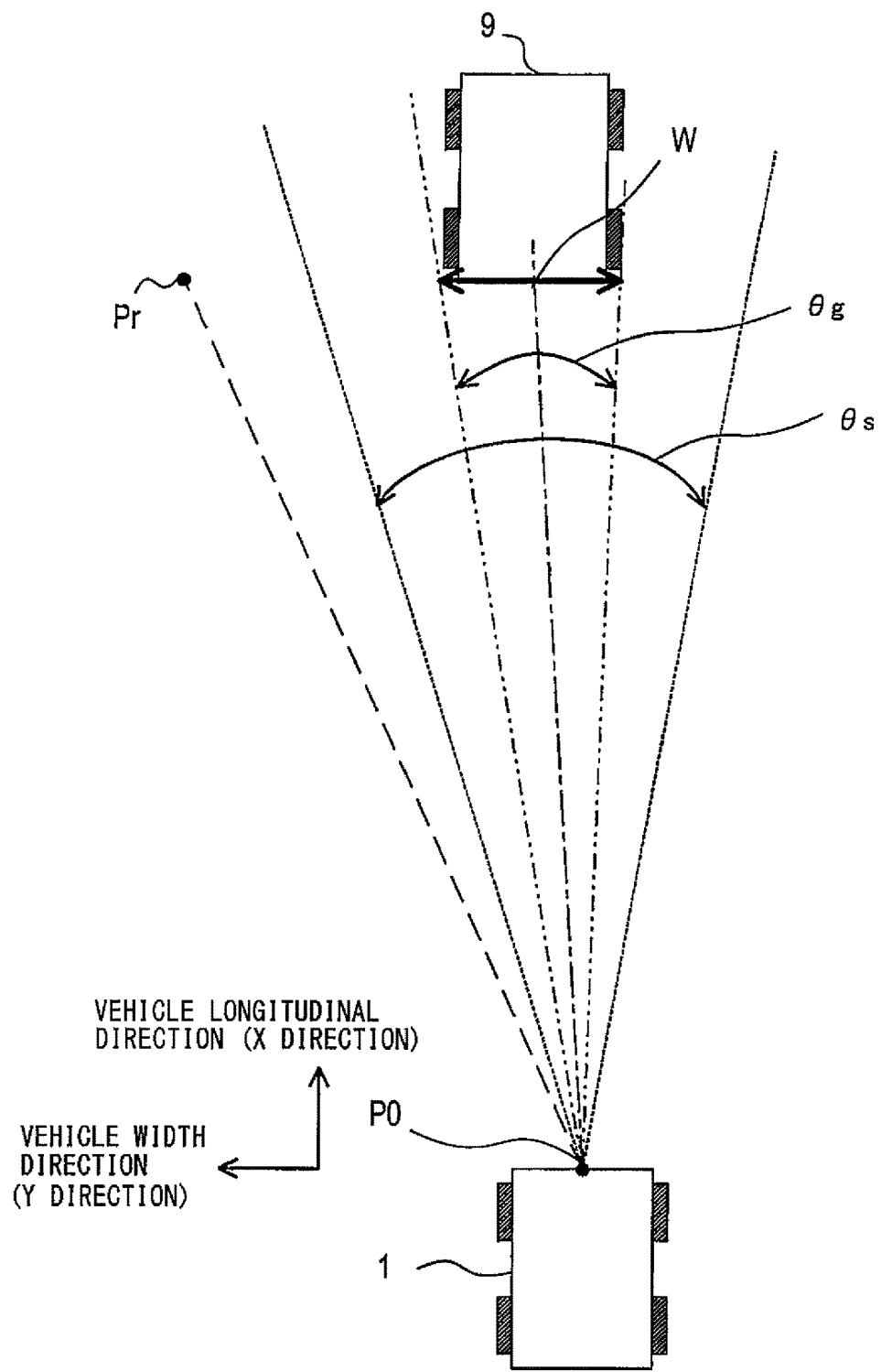
FIG. 6 is an explanatory view for describing an example of an alignment detecting method in the horizontal direction.

That is, the target recognition device 13 obtains diagnostic results by the horizontal misalignment diagnostic routine as the horizontal misalignment information in step S10. For example, the target recognition device 13 determines whether there is horizontal misalignment in the horizontal direction in the radar sensor 11 as illustrated in FIG. 6.

Specifically, the target recognition device 13 detects a predetermined target contained in an image captured by the image sensor 12. For example, the target recognition device 13 detects the distance from the own vehicle 1 to a preceding vehicle 9 as the predetermined target, and detects the vehicle width W of the preceding vehicle 9. Then, the target recognition device 13 calculates an azimuth range θg matching with the vehicle width W of the image-recognized preceding vehicle 9 in a horizontal plane including a predetermined reference point; the horizontal plane is defined by the X- and Y-axis directions illustrated in FIGS. 2 and 3. In the first embodiment, the target recognition device 13 calculates the azimuth range θg matching with the vehicle width W of the image-recognized preceding vehicle 9 in the horizontal plane including, as the predetermined reference point, the mount position, referred to as P0, of the radar sensor 11.

The target recognition device 13 determines whether all the targets detected by the radar sensor 11 are within an azimuth range θs having a predetermined angle containing the azimuth range θg matching with the vehicle width W of the preceding vehicle 9, thus determining whether there is horizontal misalignment in the radar sensor 11 in step S20.

The target recognition device 13 determines that there is no horizontal misalignment in the radar sensor 11 (NO in step S20) upon determining that all the targets detected by the radar sensor 11 are within the azimuth range θs.

Otherwise, the target recognition device 13 determines that there is horizontal misalignment in the radar sensor 11 (YES in step S20) upon determining that at least one target (see Pr in FIG. 6) detected by the radar sensor 11 is not contained in the azimuth range θs.

The target recognition device 13 terminates the radar misalignment diagnostic routine while not executing, i.e. while disabling execution of, the following vertical misalignment diagnostic routine upon determining that there is horizontal misalignment in the radar sensor 11 (YES in step S20).

Otherwise, the target recognition device 13 executes the vertical misalignment diagnostic routine in step S30 upon determining that there is no horizontal misalignment in the radar sensor 11 (NO in step S20) in step S30.

The determining operation in step S20 by the CPU 31 or a hardware structure that carries out the determining operation in step S20 serves as, for example, a determining means 13d.

The diagnostic routine in step S30 by the CPU 31 or a hardware structure that carries out the diagnostic routine in step S30 serves as, for example, a diagnostic means 13e.

The target recognition device 13 terminates the radar misalignment diagnostic routine after executing the vertical misalignment diagnostic routine in step S30.

1-2-2. Vertical Misalignment Diagnostic Routine

Figure 7:
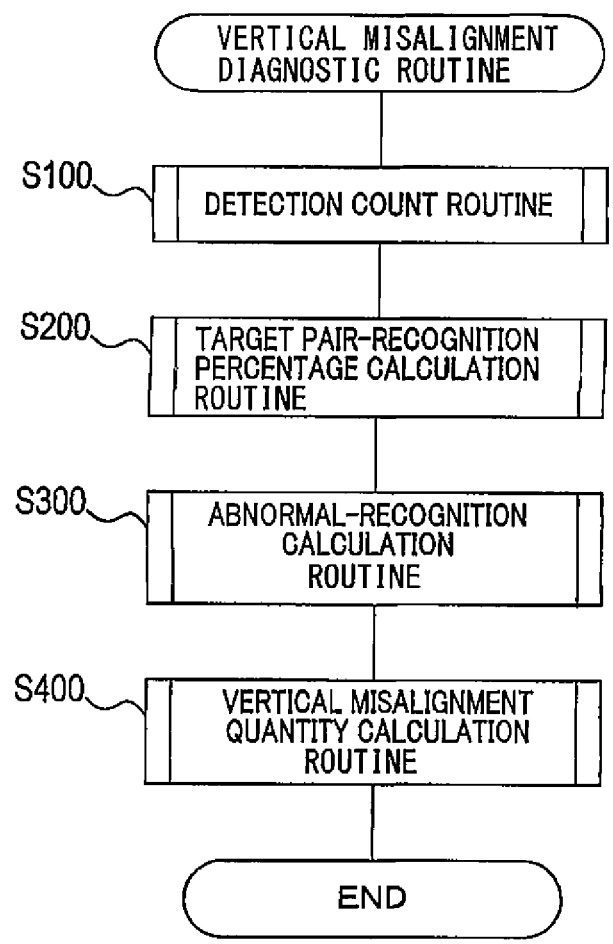
FIG. 7 is a flowchart schematically illustrating a vertical misalignment diagnostic routine in the misalignment diagnostic routine illustrated in FIG. 5.

Next, the following describes an example of the vertical misalignment diagnostic routine carried out in step S30 of the radar misalignment diagnostic routine with reference to the flowchart of FIG. 7. Hereinafter, "misalignment" simply described in the vertical misalignment diagnostic routine means "vertical misalignment".

First, in step S100, the target recognition device 13 executes a detection count routine as a subroutine. The detailed descriptions of the detection count routine will be described later. Thereafter, the vertical misalignment diagnostic routine proceeds to step S200.

In step S200, the target recognition device 13 executes a target pair-recognition percentage calculation routine as a subroutine. The detailed descriptions of the target pair-recognition percentage calculation routine will be described later. Thereafter, the vertical misalignment diagnostic routine proceeds to step S300.

In step S300, the target recognition device 13 executes an abnormal-recognition percentage calculation routine as a subroutine. The detailed descriptions of the abnormal-recognition percentage calculation routine will be described later. Thereafter, the vertical misalignment diagnostic routine proceeds to step S400.

In step S400, the target recognition device 13 executes a vertical misalignment-quantity calculation routine as a subroutine. The detailed descriptions of the vertical misalignment-quantity calculation routine will be described later. Thereafter, the target recognition device 13 terminates the vertical misalignment diagnostic routine.

1-2-2-1. Detection Count Routine

Next, the following describes the detection count routine as the subroutine of step S100 in the vertical misalignment diagnostic routine with reference to the flowchart of FIG. 8A.

First, in step S1110, the target recognition device 13 determines whether an image-based target matches with a millimeter-wave based target. Note that, in step S1110, the image-based target is the preceding vehicle 9 recognized by the image sensor 12, and the millimeter-wave based target is the preceding vehicle 9 recognized by the radar sensor 11. The matching of the image-based target and radar-based target means that the same target is recognized by the pair of the radar sensor 11 and the image sensor 12. This recognition therefore means pair recognition. That is, the target recognition device 13 determines whether the same preceding vehicle is recognized by the pair of the radar sensor 11 and the image sensor 12.

As an example, the target recognition device 13 determines that the recognized preceding vehicle 9 is recognized by the pair of radar sensor 11 and the image sensor 12 upon determining that the radar-recognized preceding vehicle 9 is located within a predetermined range including the image-recognized preceding vehicle 9.

The target recognition device 13 for example, determines whether identification information included in the millimeter-wave based target obtained as a function of the radar recognition results of the radar sensor 11 matches with identification information included in the image-based target obtained as a function of the image recognition results of the image sensor 12. The outer-appearance information of the millimeter-wave based target is an example of the identification information of the millimeter-wave based target, and the outer-appearance information of the image-based target is an example of the identification information of the image-based target.

If the identification information included in the millimeter-wave based target matches with the identification information included in the image-based target as a result of the determination, the target recognition device 13 determines that the same target, i.e. the same preceding vehicle, is recognized by the pair of the radar sensor 11 and the image sensor 12.

That is, if the determination in step S1110 is affirmative (YES in step S1110), the detection count routine proceeds to step S1120. Otherwise, if the determination in step S1110 is negative (NO in step S1110), the detection count routine proceeds to step S1130.

In step S1120, the target recognition device 13 executes the determination of the target's distance. Specifically, the target recognition device 13 determines the distance between the own vehicle 1 and the preceding vehicle 9 based on both the radar recognition and the image recognition. Note that one of the results of the radar recognition and the results of the image recognition can be used to execute the determination of the target's distance. Thereafter, the detection count routine proceeds to step S1140.

In step S1130, the target recognition device 13 executes the determination of the target's distance. Specifically, the target recognition device 13 determines the distance between the own vehicle 1 and the preceding vehicle 9 based on the image recognition. Note that the results of the image recognition are used to execute the determination of the target's distance. Thereafter, the detection count routine proceeds to step S1170.

In step S1140, the target recognition device 13 determines whether the radar-recognition results represent abnormal recognition. Specifically, the target recognition device 13 determines whether the radar-recognition results by the radar sensor 11 represent abnormal recognition results.

When it is determined that the radar-recognition results represent abnormal recognition results (YES in step S1140), the detection count routine proceeds to step S1160. Otherwise, when it is determined that the radar-recognition results represent normal recognition results (NO in step S1140), the detection count routine proceeds to step S1150.

Note that the abnormal recognition results according to the first embodiment mean results different from normal recognition results. For example, the abnormal recognition results include 1. A case where the resolution of the radar-recognition results is inferior to a predetermined resolution of normal radar-recognition results 2. A case where, while the same target is continuously, i.e. cyclically, detected, disturbance causes the same target to not be detected in a cycle.

In step S1150, the target recognition device 13 increments one of hardware or software first counters C1 prepared therein.

Specifically, the target recognition device 13 refers to a distance determination table prepared therein and illustrated in FIG. 8B, and recognizes one of the first counters C1, which matches with the distance between the own vehicle 1 and the preceding vehicle determined in step S1120. That is, each of the first counters C1 is used to represent the number of times preceding vehicles are normally recognized by radar recognition, and the first counters C1 are prepared for the respective distance sections determined in the distance determination table. Referring to FIG. 8B, the distance determination table includes the distance sections with regular 10 m intervals from 0 to 100 m, and the single distance section for not less than 100 m. Indexes [1] to [11] are assigned to the respective distance sections. Any intervals other than 10 m intervals can be used for the distance determination table, and another number of the distance sections can be used for the distance determination table.

After the operation in step S1150, the target recognition device 13 terminates the detection count routine.

In step S1160, the target recognition device 13 increments one of hardware or software second counters C2 prepared therein.

Specifically, the target recognition device 13 refers to the distance determination table prepared therein and illustrated in FIG. 8B, and recognizes one of the second counters C2, which matches with the distance between the own vehicle 1 and the preceding vehicle determined in step S1120. That is, each of the second counters C2 is used to represent the number of times preceding vehicles are abnormally recognized by radar recognition, and the second counters C2 are prepared for the respective distance sections determined in the distance determination table. After the operation in step S1160, the target recognition device 13 terminates the detection count routine.

In step S1170, the target recognition device 13 increments one of hardware or software third counters C3 prepared therein.

Specifically, the target recognition device 13 refers to the distance determination table prepared therein and illustrated in FIG. 8B, and recognizes one of the third counters C3, which matches with the distance between the own vehicle 1 and the preceding vehicle determined in step S1120. That is, each of the third counters C3 is used to represent the number of times preceding vehicles are recognized by only image recognition without being recognized by radar recognition. The third counters C3 are prepared for the respective distance sections determined in the distance determination table. After the operation in step S1170, the target recognition device 13 terminates the detection count routine.

1-2-2-2. Target Pair Recognition Percentage Calculation Routine

Next, the following describes the target pair-recognition percentage calculation routine as the subroutine of step S200 in the vertical misalignment diagnostic routine with reference to FIG. 9.

The target recognition device 13 executes the target pair-recognition percentage calculation routine each time the vertical misalignment diagnostic routine proceeds to step S20.

Figure 9A:
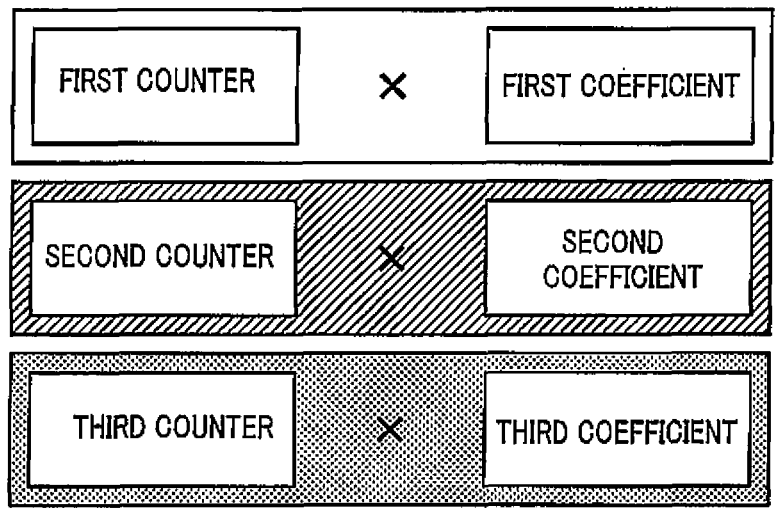
FIG. 9A is an explanatory diagram illustrating an abnormal-recognition percentage calculation routine included in the vertical misalignment diagnostic routine, and equations used by the abnormal-recognition percentage calculation routine.
Figure 9B:
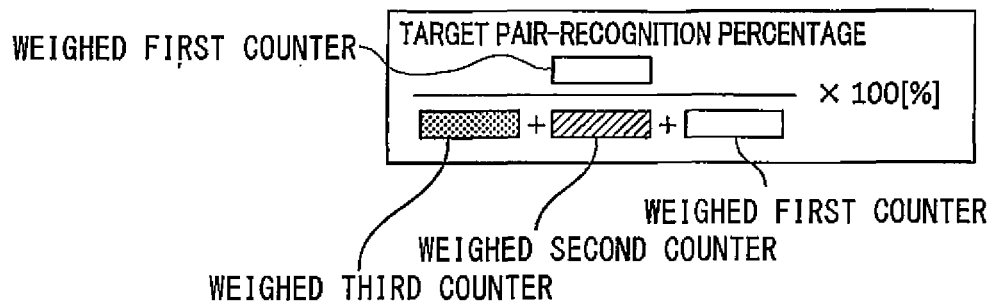
FIG. 9B is a diagram illustrating a specific solution of the first percentage calculation routine.
Figure 9C:
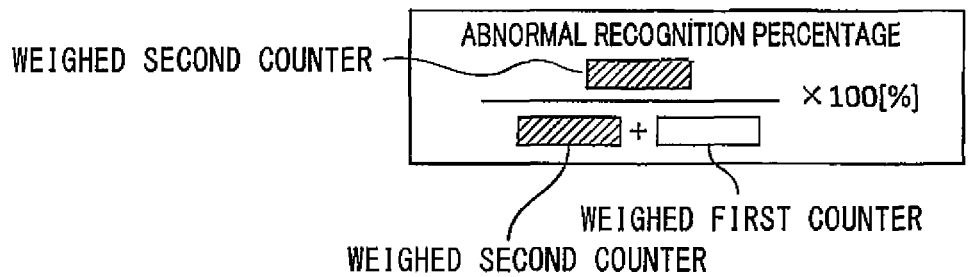
FIG. 9C is a diagram illustrating a specific solution of the second percentage calculation routine.

First, the target recognition device 13 multiplies the value of each first counter C1 by a corresponding first coefficient, multiplies the value of each second counter C2 by a corresponding second coefficient, and multiplies the value of each third counter C1 by a corresponding third coefficient (see FIG. 9A).

Note that the first, second, and third coefficients are previously established based on, for example, experiments for assigning weights to the values of the respective first, second, and third counters C1, C2, and C3.

The following describes an example of how to perform the establishment using a graph indicative of the relationship between the distance from the own vehicle V to a preceding vehicle and the target pair-recognition percentage described later as for example illustrated in FIG. 10A.

This graph shows that, in a region in which the distance from the own vehicle 1 to the preceding vehicle is relatively short, each of values of the target pair-recognition percentage described in detail later, if there is no axial misalignment in the radar sensor 11, has a small difference from a corresponding one of the values of the target pair-recognition percentage if there is axial misalignment in the radar sensor 11.

In contrast, this graph shows that, in a region in which the distance from the own vehicle 1 to the preceding vehicle is relatively long, each of values of the target pair-recognition percentage, if there is no axial misalignment in the radar sensor 11, has a large difference from a corresponding one of the values of the target pair-recognition percentage if there is axial misalignment in the radar sensor 11.

Figure 10A:
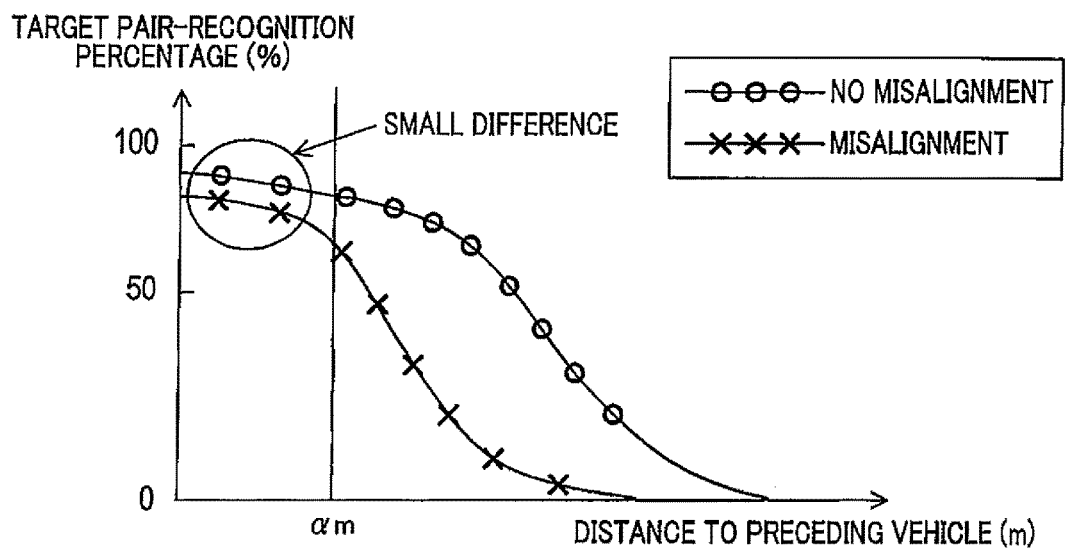
FIG. 10A is a graph illustrating the relationship between the distance from an own vehicle to a preceding vehicle and a target pair recognition percentage if no weights are assigned to all first to third counters.
Figure 10B:
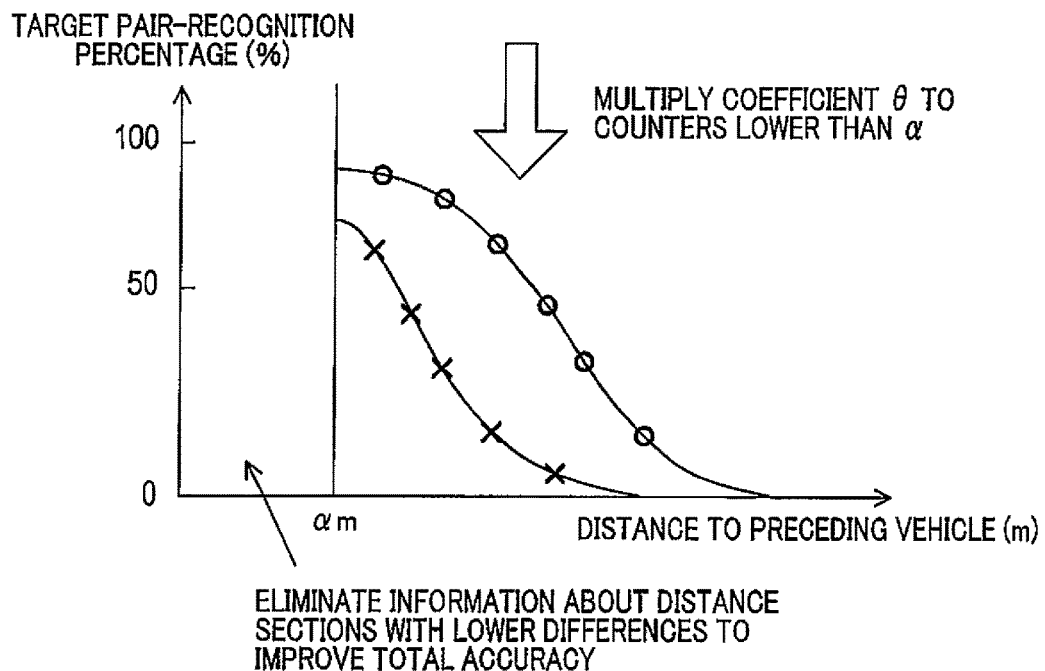
FIG. 10B is a graph illustrating the relationship between the distance from the own vehicle to the preceding vehicle and the target pair recognition percentage if a weight is assigned to at least one of the first to third counters.

For this reason, as illustrated in FIG. 10B, the coefficients are established such that weights used in the region in which the distance from the own vehicle 1 to the preceding vehicle is relatively short are smaller than weights used in the region in which the distance from the own vehicle 1 to the preceding vehicle is relatively long. In other words, the coefficients are established such that weights used in the region in which the distance from the own vehicle 1 to the preceding vehicle is relatively long are relatively larger than weights used in the region in which the distance from the own vehicle 1 to the preceding vehicle is relatively short.

In the case illustrated in FIGS. 10A and 10B, the coefficient θ of zero is configured to be multiplied by one or more counters whose corresponding distances between the vehicle 1 and the preceding vehicle are lower than α m. This eliminates information about predetermined distance sections with lower differences, thus improving the total accuracy (see FIG. 10B).

Subsequently, the target recognition device 13 calculates the target pair-recognition percentage. Specifically, for each distance section of the distance determination table, the target recognition device 13 divides the weighted value of the first counter C1 by the sum of the weighted value of the first counter C1, the weighted value of the second counter C2, and the weighted value of the third counter C3. This calculates the target pair-recognition percentage in units of % (see FIG. 9B).

The target pair-recognition percentage represents an example of the relationship, i.e. the ratio, between the number of times the preceding vehicle 9 is recognized by the pair of the radar recognition and the image recognition and the number of times the preceding vehicle 9 is recognized by at least one of the radar recognition and the image recognition. For example, the greater the number of times the preceding vehicle 9 is recognized by the pair of the radar recognition and the image recognition, the higher the target pair-recognition percentage. In contrast, the greater the number of times the preceding vehicle 9 is recognized by merely the image recognition is, the lower the target pair-recognition percentage is.

Thereafter, the target recognition device 13 terminates the target pair-recognition percentage calculation routine.

1-2-2-3. Abnormal-Recognition Percentage Calculation Routine

Next, the following describes the abnormal-recognition percentage calculation routine as the subroutine of step S300 in the vertical misalignment diagnostic routine with reference to FIG. 9.

The target recognition device 13 executes the abnormal-recognition percentage calculation routine each time the vertical misalignment diagnostic routine proceeds to step S300.

First, the target recognition device 13 multiplies the value of each first counter C1 by the corresponding first coefficient, and multiplies the value of each second counter C2 by the corresponding second coefficient (see FIG. 9A).

Subsequently, the target recognition device 13 calculates the abnormal-recognition percentage. Specifically, for each distance section of the distance determination table, the target recognition device 13 divides the weighted value of the second counter C2 by the sum of the weighted value of the first counter C1 and the weighted value of the second counter C2. This calculates the abnormal-recognition percentage in units of % (see FIG. 9C).

Thereafter, the target recognition device 13 terminates the abnormal-recognition percentage calculation routine.

1-2-2-4. Vertical Misalignment-Quantity Calculation Routine

Next, the following describes the vertical misalignment-quantity calculation routine as the subroutine of S400 in the vertical misalignment diagnostic routine with reference to FIG. 11.

The target recognition device 13 executes the vertical misalignment-quantity calculation routine each time the vertical misalignment diagnostic routine proceeds to step S400.

That is, the target recognition device 13 estimates a vertical misalignment quantity in the vertical direction, which has occurred in the radar sensor 11, in accordance with the target pair-recognition percentage calculated in step S200 and the abnormal-recognition percentage calculated in step S300. The vertical misalignment quantity is also referred to as a vertical misalignment estimator.

Figures 11A, 11B:
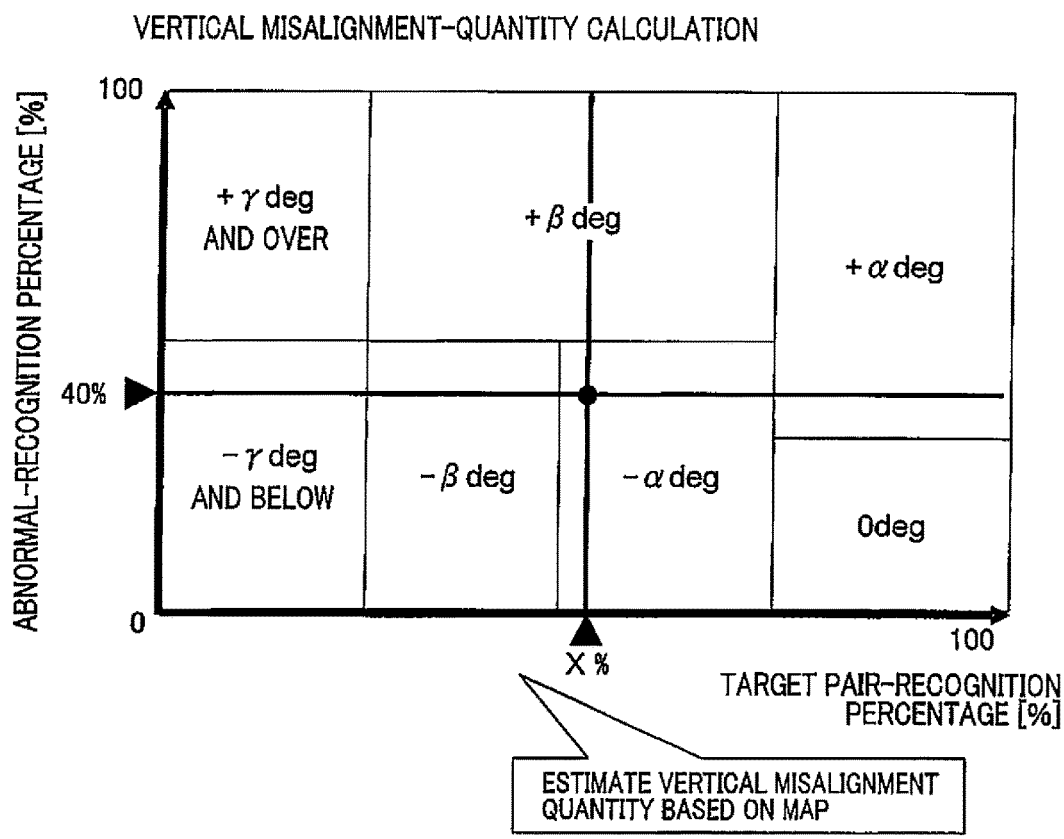
FIG. 11A is a diagram illustrating a first map used by a vertical misalignment-quantity calculation routine included in the vertical misalignment diagnostic routine.
FIG. 11B is a diagram illustrating a second map used by the vertical misalignment-quantity calculation routine included in the vertical misalignment diagnostic routine.

Specifically, the target recognition device 13 refers to a map M stored therein, illustrated as an example in FIG. 11A, and extracts, in the map M, a region corresponding to the calculated target pair-recognition percentage and abnormal-recognition percentage. Then, the target recognition device 13 determines that the value of the vertical misalignment quantity, which is allocated to the extracted region (see FIG. 11B).

Note that, in the map M, each region and the value of the vertical misalignment quantity allocated to each region are previously established based on, for example, experiments.

For example, the target pair-recognition percentage has the following characteristics that, the higher the target pair-recognition percentage is, the lower the absolute value of the vertical misalignment quantity is. That is, the target pair-recognition percentage has the following characteristics that, the lower the target pair-recognition percentage is, the higher the absolute value of the vertical misalignment quantity is.

The abnormal-recognition percentage has the following characteristics that the vertical misalignment quantity is positive when the abnormal-recognition percentage is low, and the vertical misalignment quantity is negative when the abnormal-recognition percentage is high. Note that, in the vertical plane including the radar beam axis, the upper-side misalignment of the radar beam axis with respect to the designed beam axis position represents a positive misalignment quantity. In addition, in the vertical plane including the radar beam axis, the lower-side misalignment of the radar beam axis with respect to the designed beam axis position represents a negative misalignment quantity.

Based on the characteristics, the target recognition device 13 can establish each region and the value of the vertical misalignment quantity allocated to each region in the map M.

An example illustrated in FIG. 11B represents that the value of the vertical misalignment quantity is $-\alpha$ degrees (deg) when the target pair-recognition percentage is X % and the abnormal-recognition percentage is Y %.

Thereafter, the target recognition device 13 terminates the vertical misalignment-quantity calculation routine.

1-3. Advantageous Effects

As described above, the target recognition device 13 in the drive assist system 10 according to the first embodiment determines whether there is horizontal misalignment in the radar sensor 11 before performing whether there is vertical misalignment in the radar sensor 11. This disables the target recognition device 13 from executing the diagnosis of misalignment in the vertical direction if it is determined that there is horizontal misalignment in the radar sensor 11. This enables the first embodiment to achieve the first advantageous effect that prevents the state of horizontal misalignment from being erroneously detected as the state of vertical misalignment. In other words, the first embodiment prevents erroneous detection of vertical misalignment of a beam sensor, such as the beam sensor 11.

Otherwise, the target recognition device 13 executes the vertical misalignment diagnostic routine upon determining that there is no horizontal misalignment in the radar sensor 11, thus diagnosing whether there is misalignment of a beam sensor, such as the radar sensor 11 in the vertical direction. Then, the target recognition device 13 detects the vertical misalignment quantity upon diagnosing that there is vertical misalignment in the beam sensor.

That is, the target recognition device 13 diagnoses whether there is vertical misalignment in the beam sensor while there are certainly determined that there is no horizontal misalignment. Then, the target recognition device 13 detects the vertical misalignment quantity upon diagnosing that there is vertical misalignment in the beam sensor.

For this reason, the first embodiment achieves the second advantageous effect of enabling the various types of control for improving the running safety of the vehicle 1 to be carried out with higher accuracy.

The target recognition device 13 performs radar recognition of a preceding vehicle 9 running in front of the own vehicle 1. Additionally, the target recognition device 13 performs image recognition of the preceding vehicle 9 running in front of the own vehicle 1 based on a captured image of the front scene of the own vehicle 1.

Then, the target recognition device 13 calculates, based on the radar-recognition results and the image-recognition results, the percentage of the number of times the preceding vehicle 9 is recognized by the pair of the radar recognition and the image recognition to the number of times the preceding vehicle 9 is recognized by at least the image recognition. Note that an example of the percentage is the pair-recognition percentage. The target recognition device 13 detects, based on the calculated value of the percentage, vertical misalignment, which has occurred in a beam sensor, such as the radar sensor 11 (see (a) and (b) in FIG. 12). This enables the first embodiment to achieve the third advantageous effect of detecting vertical misalignment of the radar sensor 11 installed in the own vehicle 1 while the own vehicle 1 is running with higher accuracy.

The target recognition device 13 calculates a value of the target pair-recognition percentage for each of prepared distances between the own vehicle 1 and the preceding vehicle 9 in the vertical misalignment diagnostic routine. Then, the target recognition device 13 adds predetermined weights to the values of the target pair-recognition percentage for the respective prepared distances, and calculates the sum of the weighed values. The target recognition device 13 determines whether there is vertical misalignment, which has occurred in the radar sensor 11, as a function of the calculated sum. This enables the first embodiment to achieve the fourth advantageous effect of detecting vertical misalignment of the radar sensor 11 installed in the own vehicle 1 with further higher accuracy.

The target recognition device 13 calculates the percentage of the preceding vehicle 9 being normally recognized, i.e. the normal recognition percentage, and the percentage of the preceding vehicle 9 being abnormally recognized, i.e. the abnormal recognition percentage in the vertical misalignment diagnostic routine. Then, the target recognition device 13 determines whether there is vertical misalignment, which has occurred in a beam sensor, such as the radar sensor 11, as a function of the calculated normal recognition percentage and the calculated abnormal recognition percentage. In addition, the target recognition device 13

(1) Determines whether an upper-side misalignment or a lower-side misalignment has occurred upon determining that there is vertical misalignment (2) Determines a misalignment quantity of the upper-side or lower-side misalignment.

This enables the first embodiment to achieve the fifth advantageous effect of detecting vertical misalignment of the radar sensor 11 installed in the own vehicle 1 with further higher accuracy.

Note that the target recognition device 13 according to the first embodiment serves as an example of a detection device, an obtaining means, a determining means, a diagnosis means, a radar recognition means, and an image recognition means. The operation in step S20 serves as an example of the determining means and the operation in step S30 serves as an example of a detection means.

2. Second Embodiment

2-1. Different Points from First Embodiment

The fundamental structure of the second embodiment is basically identical to that of the first embodiment except for the following different point. So, the following mainly describes the different points while omitting the descriptions of the common structure.

Figure 13:
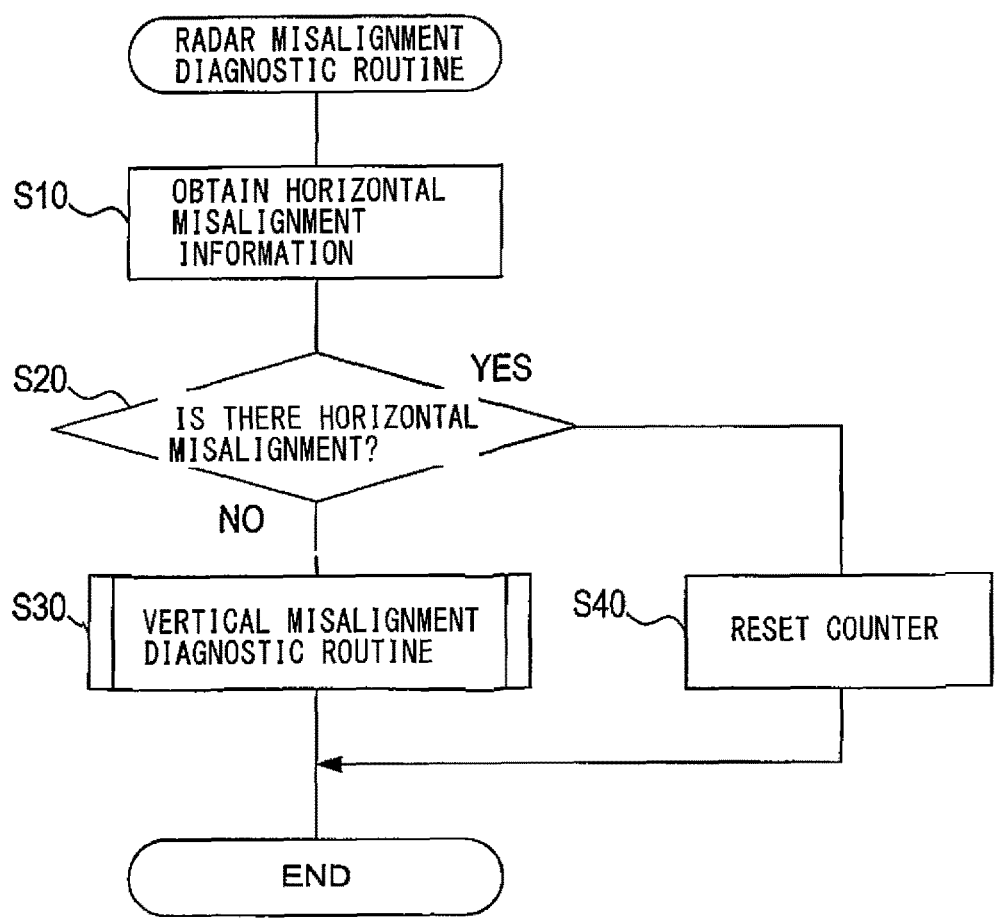
FIG. 13 is a flowchart schematically illustrating a misalignment diagnostic routine according to the second embodiment of the present disclosure.

Referring to FIG. 13, the target recognition device 13 according to the second embodiment resets all the counters C1 to C3 upon determining that there is horizontal misalignment in the radar misalignment diagnostic routine.

2-2. Routine

Next, the following describes the radar misalignment diagnostic routine according to the second embodiment with reference to the flowchart of FIG. 13.

The target recognition device 13 executes the same operations as the respective operations in steps S10 and S20 according to the first embodiment.

Upon determining that there is no horizontal misalignment in the radar sensor 11 (NO in step S20), the target recognition device 13 executes the vertical misalignment diagnostic routine in step S30 in the same procedure as the first embodiment. The target recognition device 13 terminates the radar misalignment diagnostic routine when completing the vertical misalignment diagnostic routine.

Otherwise, upon determining that there is horizontal misalignment in the radar sensor 11 (YES in step S20), the target recognition device 13 executes the operation in step S40 to reset all the counters C1, C2, and C3. The in step S40 by the CPU 13 or a hardware structure that carries out the operation in step S40 serves as, for example, a reset means.

Specifically, the target recognition device 13 resets the counters used to execute the count detection routine, i.e. the first counter C1, second counter C2, and third counter C3. Thereafter, the target recognition device 13 terminates the radar misalignment diagnostic routine.

2-3. Advantageous Effects

The second embodiment described in detail above achieves the following advantageous effects in addition to the first to fifth advantageous effects of the first embodiment.

The target recognition device 13 resets all the counters used to execute the count detection routine, i.e. all the first counter C1, second counter C2, and third counter C3 upon determining that there is horizontal misalignment in the radar misalignment diagnostic routine.

Let us assume that there is horizontal misalignment in the radar sensor 11. In addition, let us assume that it takes some to obtain horizontal misalignment information indicative of the occurrence of horizontal misalignment, which has elapsed since the horizontal misalignment actually occurred.

Under these assumptive situations, the target recognition device 13 resets the first to third counters C1 to C3 when obtaining the horizontal misalignment information indicative of the occurrence of horizontal misalignment. This prevents the counted values of the first to third counters C1 to C3 for the period from the time when the horizontal misalignment actually occurred to the time when the horizontal misalignment information is actually obtained, i.e. incorrectly counted values, from being used for the vertical misalignment diagnostic routine.

The second embodiment therefore achieves the sixth advantageous effect of (1) Higher-accuracy determination of whether there is vertical misalignment in the vertical misalignment diagnostic routine (2) Higher-accuracy detection of vertical misalignment when it is determined that there is vertical misalignment.

In the second embodiment, the target recognition device 13 serves as, for example, a first count means, a second count means, and a reset means. The operation in step S1170 serves as an example of the first count means, the operations in steps S1150 and S1160 serve as an example of the second count means, and the operation in step S40 serves as an example of the reset means.

3. Third Embodiment

3-1. Different Points from First Embodiment

The fundamental structure of the third embodiment is basically identical to that of the first embodiment except for the following different point. So, the following mainly describes the different point while omitting the descriptions of the common structure.

The target recognition device 13 according to the first embodiment detects, based on the radar recognition and the image recognition of the preceding vehicle 9, vertical misalignment that has occurred in the radar sensor 11.

In contrast, the target recognition device 13 according to the first embodiment performs misalignment detection depending on the height of the preceding vehicle 9.

3-2. Routine

Specifically, the target recognition device 13 executes a detection count routine illustrated in FIG. 14 in place of the detection count routine illustrated in FIG. 8, and executes a target pair-recognition percentage calculation routine illustrated in FIG. 15 in place of the target pair-recognition percentage calculation routine illustrated in FIG. 9. In addition, the target recognition device 13 executes an abnormal-recognition percentage calculation routine illustrated in FIG. 15 in place of the abnormal-recognition percentage calculation routine illustrated in FIG. 9. Note that the target recognition device 13 executes a vertical misalignment-quantity calculation routine in step S40, which is identical to the vertical misalignment-quantity calculation routine according to the first embodiment.

Next, the following sequentially describes the detection count routine, the target pair-recognition percentage calculation routine, and the abnormal-recognition calculation routine according to the third embodiment.

3-2-1 Detection Count Routine

Next, the following describes the detection count routine carried out by the operation in step S100 of the vertical misalignment diagnostic routine.

First, in step S1205, like step S1110, the target recognition device 13 determines whether an image-based target matches with a millimeter-wave based target. That is, the target recognition device 13 determines whether the same preceding vehicle 9 is recognized by the pair of the radar recognition by the radar sensor 11 and the image recognition by the image sensor 12.

If the determination in step S1205 is affirmative (YES in step S1205), the detection count routine proceeds to step S1210. Otherwise, if the determination in step S1205 is negative (NO in step S1205), the detection count routine proceeds to step S1215.

In step S1210, like step S1120, the target recognition device 13 executes the determination of the target's distance. Specifically, the target recognition device 13 determines the distance between the own vehicle 1 and the preceding vehicle 9 recognized by both the radar recognition and the image recognition. Note that one of the results of the radar recognition and the results of the image recognition can be used to execute the determination of the target's distance. Thereafter, the detection count routine proceeds to step S1220.

In step S1215, like step S1130, the target recognition device 13 executes the determination of the target's distance. Specifically, the target recognition device 13 determines the distance between the own vehicle 1 and the preceding vehicle 9 recognized by the image recognition. Note that the results of the image recognition are used to execute the determination of the target's distance. Thereafter, the detection count routine proceeds to step S1235.

In step S1220, like step S1140, the target recognition device 13 determines whether the radar-recognition results represent abnormal recognition. Specifically, the target recognition device 13 determines whether the radar-recognition results by the radar sensor 11 represent abnormal recognition results.

When it is determined that the radar-recognition results represent the abnormal recognition results (YES in step S1220), the detection count routine proceeds to step S1230. Otherwise, when it is determined that the radar-recognition results represent normal recognition results (NO in step S1220), the detection count routine proceeds to step S1225.

In step S1225, the target recognition device 13 determines whether the vehicle height of the preceding vehicle 9 is higher than the vehicle heights of standard vehicles. Specifically, the target recognition device 13 determines whether the vehicle height of the preceding vehicle 9 is higher than a predetermined threshold in accordance with the results of the image recognition. Note that the predetermined threshold is previously set based on, for example, experiments in order to remove preceding vehicles, such as trucks, whose vehicle heights are higher than the vehicle heights of standard vehicles (see FIGS. 12C and 12D).

If the determination in step S1225 is affirmative (YES in step S1225), the detection count routine proceeds to step S1245. Otherwise, if the determination in step S1225 is negative (NO in step S1225), the detection count routine proceeds to step S1240.

In step S1230, like step S1225, the target recognition device 13 determines whether the vehicle height of the preceding vehicle 9 is higher than the vehicle heights of standard vehicles. Specifically, the target recognition device 13 determines whether the vehicle height of the preceding vehicle 9 is higher than the predetermined threshold in accordance with the results of the image recognition.

If the determination in step S1230 is affirmative (YES in step S1230), the detection count routine proceeds to step S1255. Otherwise, if the determination in step S1230 is negative (NO in step S1230), the detection count routine proceeds to step S1250.

In step S1235, like step S1225, the target recognition device 13 determines whether the vehicle height of the preceding vehicle 9 is higher than the vehicle heights of standard vehicles. Specifically, the target recognition device 13 determines whether the vehicle height of the preceding vehicle 9 is higher than the predetermined threshold in accordance with the results of the image recognition.

If the determination in step S1235 is affirmative (YES in step S1235), the detection count routine proceeds to step S1265. Otherwise, if the determination in step S1235 is negative (NO in step S1235), the detection count routine proceeds to step S1260.

In step S1240, the target recognition device 13 increments one of hardware or software fourth counters C4 prepared therein.

Figures 14A, 14B:
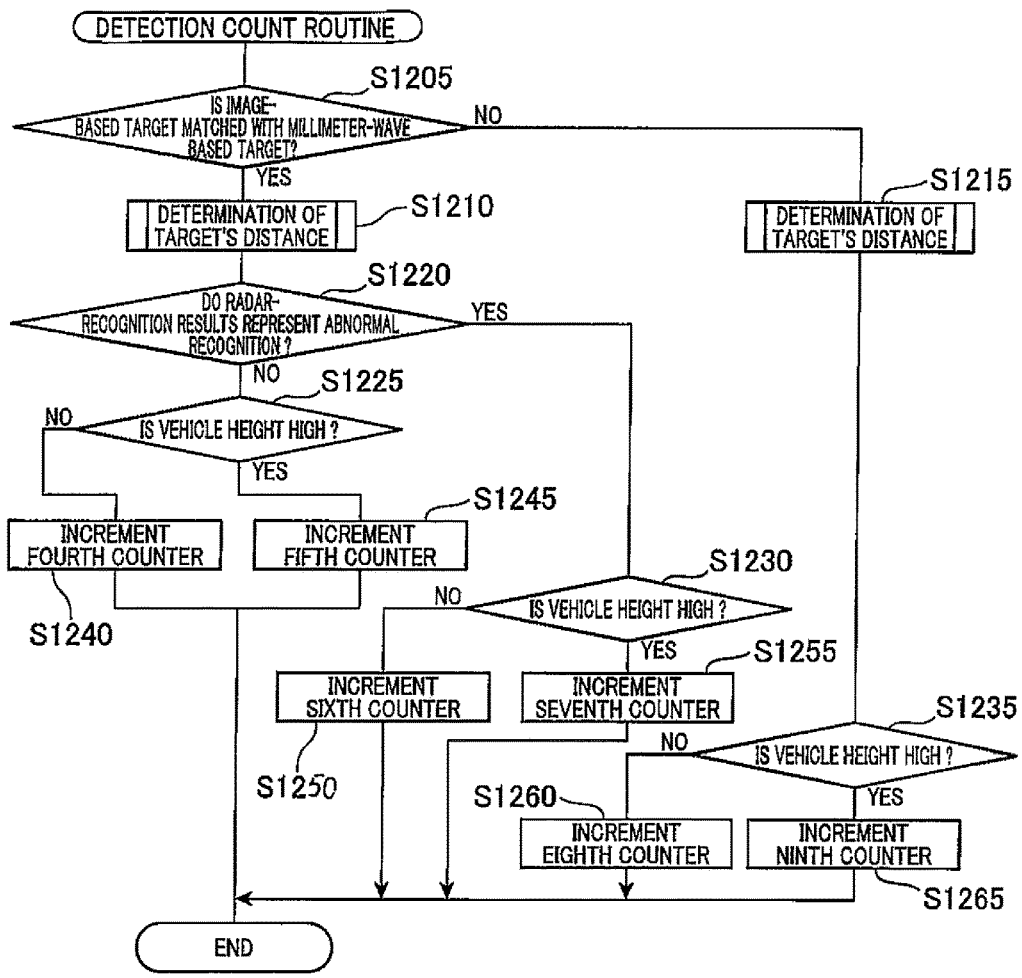
FIG. 14A is a flowchart illustrating a detection count routine according to the third embodiment of the present disclosure.
FIG. 14B is a diagram illustrating a distance determination table according to the third embodiment of the present disclosure.

Specifically, the target recognition device 13 refers to a distance determination table prepared therein and illustrated in FIG. 14B, and recognizes one of the fourth counters C4, which matches with the distance between the own vehicle 1 and the preceding vehicle 9 determined in step S1210. The information stored in the distance determination table is set to be identical to the information stored in the distance determination table illustrated in FIG. 8B, but can be set to be different the information stored in the distance determination table illustrated in FIG. 8B.

That is, each of the fourth counters C4 is used to represent the number of times preceding vehicles 9 whose heights are lower than the predetermined threshold are normally recognized by radar recognition, and the fourth counters C4 are prepared for the respective distance sections determined in the distance determination table.

After the operation in step S1240, the target recognition device 13 terminates the detection count routine.

In step S1245, the target recognition device 13 increments one of hardware or software fifth counters C5 prepared therein.

Specifically, the target recognition device 13 refers to the distance determination table prepared therein and illustrated in FIG. 14B, and recognizes one of the fifth counters C5, which matches with the distance between the own vehicle 1 and the preceding vehicle 9 determined in step S1210. That is, each of the fifth counters C5 is used to represent the number of times preceding vehicles whose heights are equal to or higher than the predetermined threshold are normally recognized by radar recognition, and the fifth counters C5 are prepared for the respective distance sections determined in the distance determination table.

After the operation in step S1245, the target recognition device 13 terminates the detection count routine.

In step S1250, the target recognition device 13 increments one of hardware or software sixth counters C6 prepared therein.

Specifically, the target recognition device 13 refers to the distance determination table prepared therein and illustrated in FIG. 8B, and recognizes one of the sixth counters C6, which matches with the distance between the own vehicle 1 and the preceding vehicle determined in step S1210. That is, each of the sixth counters C6 is used to represent the number of times preceding vehicles whose heights are lower than the predetermined threshold are abnormally recognized by radar recognition, and the sixth counters C6 are prepared for the respective distance sections determined in the distance determination table.

After the operation in step S1250, the target recognition device 13 terminates the detection count routine.

In step S1255, the target recognition device 13 increments one of hardware or software seventh counters C7 prepared therein.

Specifically, the target recognition device 13 refers to the distance determination table prepared therein and illustrated in FIG. 14B, and recognizes one of the seventh counters C7, which matches with the distance between the own vehicle 1 and the preceding vehicle 9 determined in step S1210. That is, each of the seventh counters C7 is used to represent the number of times preceding vehicles whose heights are equal to or higher than the predetermined threshold are abnormally recognized by radar recognition, and the seventh counters C7 are prepared for the respective distance sections determined in the distance determination table.

After the operation in step S1255, the target recognition device 13 terminates the detection count routine.

In step S1260, the target recognition device 13 increments one of hardware or software eighth counters C8 prepared therein.

Specifically, the target recognition device 13 refers to the distance determination table prepared therein and illustrated in FIG. 14B, and recognizes one of the eighth counters C8, which matches with the distance between the own vehicle 1 and the preceding vehicle 9 determined in step S1215. That is, each of the eighth counters C8 is used to represent the number of times preceding vehicles whose heights are lower than the predetermined threshold are recognized by only image recognition without being recognized by radar recognition. The eighth counters C8 are prepared for the respective distance sections determined in the distance determination table. After the operation in step S1260, the target recognition device 13 terminates the detection count routine.

In step S1265, the target recognition device 13 increments one of hardware or software ninth counters C9 prepared therein.

Specifically, the target recognition device 13 refers to the distance determination table prepared therein and illustrated in FIG. 14B, and recognizes one of the ninth counters C9, which matches with the distance between the own vehicle 1 and the preceding vehicle 9 determined in step S1215. That is, each of the ninth counters C9 is used to represent the number of times preceding vehicles whose heights are equal to or higher than the predetermined threshold are recognized by only image recognition without being recognized by radar recognition. The ninth counters C9 are prepared for the respective distance sections determined in the distance determination table. After the operation in step S1265, the target recognition device 13 terminates the detection count routine.

3-2-2 Target Pair-Recognition Percentage Calculation Routine

Figure 15A:
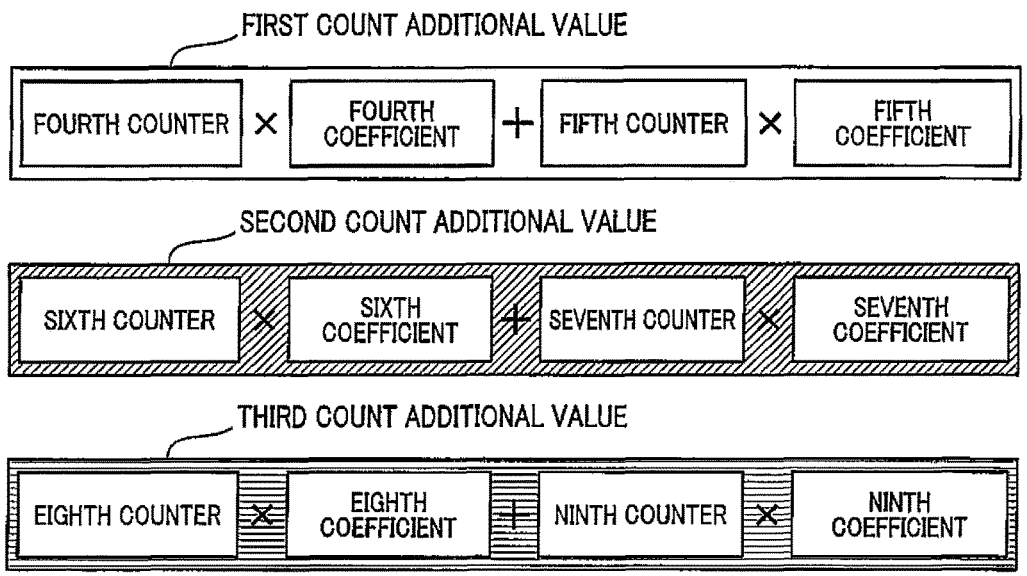
FIG. 15A is an explanatory diagram illustrating equations used by a target pair-recognition percentage calculation routine and an abnormal-recognition percentage calculation routine according to the third embodiment of the present disclosure.
Figure 15B:
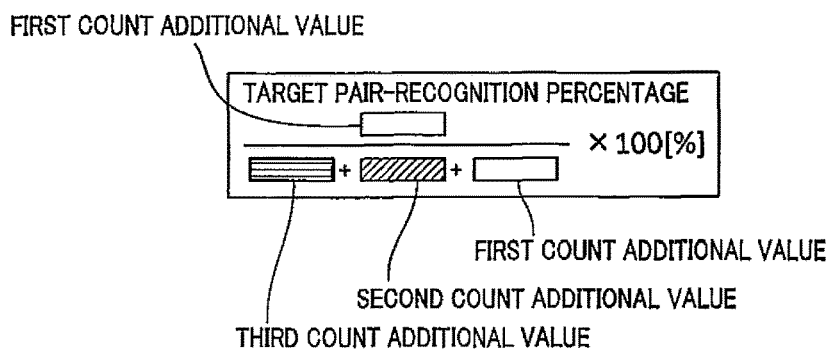
FIG. 15B is a diagram illustrating a specific solution of the first percentage calculation routine according to the third embodiment.
Figure 15C:
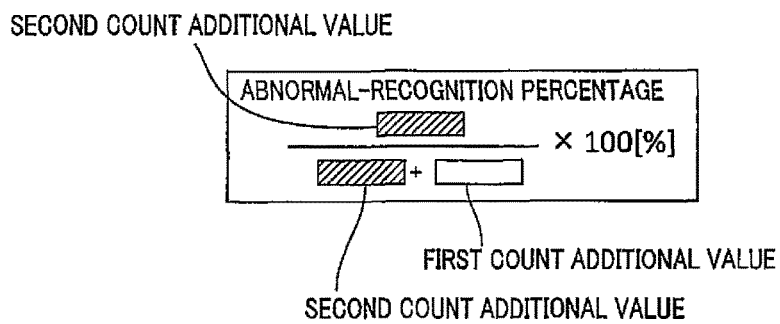
FIG. 15C is a diagram illustrating a specific solution of the second percentage calculation routine according to the third embodiment.

Next, the following describes the target pair-recognition percentage calculation routine executed in step S200 of the vertical misalignment diagnostic routine with reference to FIGS. 15A to 15C.

First, the target recognition device 13 multiplies the value of each fourth counter C4 by a corresponding fourth coefficient, and multiplies the value of each fifth counter C5 by a corresponding fifth coefficient (see FIG. 15A). Then, the target recognition device 13 calculates the sum of the value of each fourth counter C4 obtained by the multiplication and the value of the corresponding fifth counter C5 obtained by the multiplication, thus calculating a first count additional value for each of the distance sections of the distance determination table.

In addition, the target recognition device 13 multiplies the value of each sixth counter C6 by a corresponding sixth coefficient, and multiplies the value of each seventh counter C7 by a corresponding seventh coefficient (see FIG. 15A). Then, the target recognition device 13 calculates the sum of the value of each sixth counter C6 obtained by the multiplication and the value of the corresponding seventh counter C7 obtained by the multiplication, thus calculating a second count additional value for each of the distance sections of the distance determination table.

Moreover, the target recognition device 13 multiplies the value of each eighth counter C8 by a corresponding eighth coefficient, and multiplies the value of each ninth counter C9 by a corresponding ninth coefficient (see FIG. 15A). Then, the target recognition device 13 calculates the sum of the value of each eighth counter C8 obtained by the multiplication and the value of the corresponding ninth counter C9 obtained by the multiplication, thus calculating a third count additional value for each of the distance sections of the distance determination table.

Note that the fourth to ninth coefficients are previously established based on, for example, experiments for assigning weights to the values of the respective fourth to ninth counters.

Next, the target recognition device 13 calculates the target pair-recognition percentage. Specifically, for each distance section of the distance determination table, the target recognition device 13 divides the first count additional value by the sum of the second and third count additional values. This calculates the target pair-recognition percentage in units of % (see FIG. 15B).

Thereafter, the target recognition device 13 terminates the target pair-recognition percentage calculation routine.

3-2-2 Abnormal-Recognition Percentage Calculation Routine

Next, the following describes the abnormal-recognition percentage calculation routine executed in step S300 of the vertical misalignment diagnostic routine with reference to FIGS. 15A to 15C.

First, the target recognition device 13 multiplies the value of each fourth counter C4 by the corresponding fourth coefficient, and multiplies the value of each fifth counter C5 by the corresponding fifth coefficient (see FIG. 15A). Then, the target recognition device 13 calculates the sum of the value of each fourth counter C4 obtained by the multiplication and the value of the corresponding fifth counter C5 obtained by the multiplication, thus calculating the first count additional value for each of the distance sections of the distance determination table.

In addition, the target recognition device 13 multiplies the value of each sixth counter C6 by the corresponding sixth coefficient, and multiplies the value of each seventh counter C7 by the corresponding seventh coefficient (see FIG. 15A). Then, the target recognition device 13 calculates the sum of the value of each sixth counter C6 obtained by the multiplication and the value of the corresponding seventh counter C7 obtained by the multiplication, thus calculating the second count additional value for each of the distance sections of the distance determination table.

Next, the target recognition device 13 calculates the abnormal-recognition percentage. Specifically, for each distance section of the distance determination table, the target recognition device 13 divides the first count additional value by the sum of the first and second count additional values. This calculates the abnormal-recognition percentage in units of % (see FIG. 15C).

Thereafter, the target recognition device 13 terminates the abnormal-recognition percentage calculation routine.

3-3. Advantageous Effect

The third embodiment described in detail above achieves the following advantageous effects in addition to the advantageous effects of the first embodiment.

The target recognition device 13 according to the third embodiment calculates the target pair-recognition percentage and the abnormal-recognition percentage for each of the different vehicle heights of the preceding vehicles 9 in the vertical misalignment diagnostic routine. Then, the target recognition device 13 according to the third embodiment detects axial misalignment of the radar sensor 11 in the vertical plane according to the target pair-recognition percentage and the abnormal-recognition percentage calculated for each of the different vehicle heights of the preceding vehicles 9. This results in higher-accuracy detection of axial misalignment.

In addition, the target recognition device 13 determines whether the vehicle height of the preceding vehicle 9 is higher than the predetermined threshold in the vertical misalignment diagnostic routine, i.e. the detection count routine. Then, the target recognition device 13 calculates the target pair-recognition percentage and the abnormal-recognition percentage while eliminating the preceding vehicles 9 whose heights are higher than the predetermined threshold. This results in further higher-accuracy detection of axial misalignment.

4. Various Modifications

The first to third embodiments of the present invention have been described, but the present invention is not limited to the first to third embodiments, and can be naturally modified as various modifications.

The target recognition device 13 of each embodiment is configured to detect a vertical misalignment quantity of the radar sensor 11 in the vertical direction in the vertical misalignment diagnostic routine, but can be configured to detect only information about whether there is vertical misalignment in the vertical direction.

Each embodiment defines (1) Horizontal misalignment based on the angle between the center axis M of the detection range of the radar sensor 11 and the horizontal direction, i.e. the X-axis direction (2) Vertical misalignment based on the angle between the center axis M of the detection range of the radar sensor 11 and the vertical direction, i.e. the Y-axis direction.

However, the other definitions can be made.

An axis of the radar sensor 11 for defining axial misalignment can be different from the center axis M. For example, an axis, which extends from the radar sensor 11 as the starting point, toward the probing range of targets can be established, and horizontal misalignment and vertical misalignment can be defined based on the established axis.

The vertical misalignment diagnostic routine described in the third embodiment can be applied to the vertical misalignment diagnostic routine, which is carried out by the target recognition device 13 in step S30 according to the second embodiment. The counter reset operation in step S40 according to this modification resets all the counters illustrated in the flowchart of FIG. 14, i.e. the fourth to ninth counters C4 to C9.

The target recognition device 13 according to each embodiment detects horizontal misalignment in the radar sensor 11 using the radar sensor 11 and the image sensor 12, but horizontal misalignment can be detected using other various methods.

For example, the target recognition device 13 can detect, for example, a traffic sign provided on a travelling road for the own vehicle 1 using the image sensor 12. Then, the target recognition device 13 can detect horizontal misalignment in the radar sensor 11 in accordance with how the detected positions, i.e. horizontal positions, of the traffic sign or the like.

Figure 16:
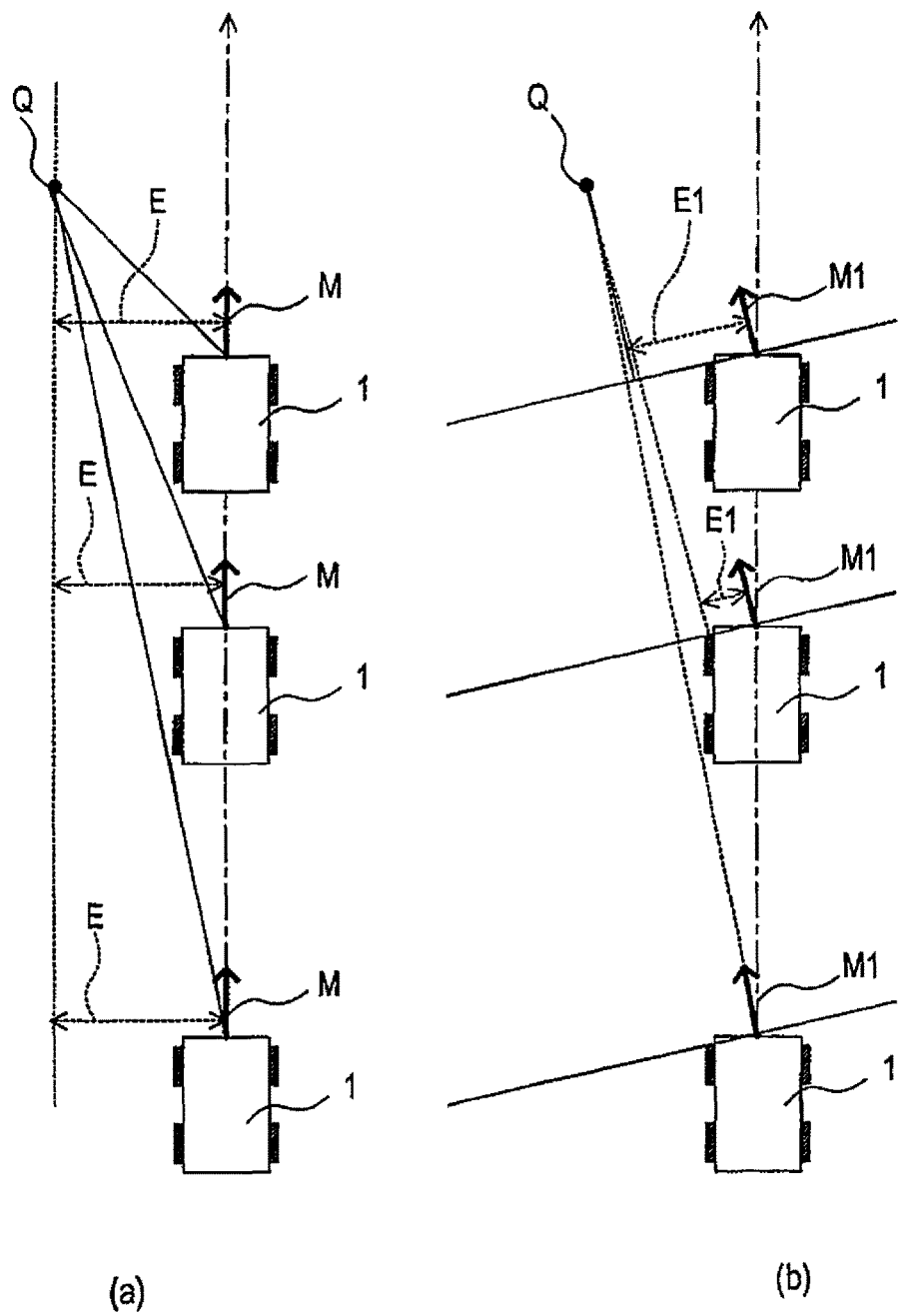
FIG. 16 includes an explanatory view, indicated by reference character (a), for describing a horizontal position of a traffic sign if there is no horizontal misalignment, and an explanatory view, indicated by reference character (b), for describing a horizontal position of a traffic sign if there is horizontal misalignment.

Specifically, as illustrated as an example in reference character (a) of FIG. 16, the horizontal positions E of a traffic sign Q detected in a running road for the own vehicle 1 are detected to be a constant value independently of change of the distance between the own vehicle 1 and the traffic sign Q if there is no horizontal misalignment in the radar sensor 11. Note that, if the center axis M of the detection range of the radar sensor 1 matches with the travelling direction of the own vehicle 1, i.e. the X-axis, it is determined that there is no horizontal misalignment in the radar sensor 11. Each of the horizontal positions E of the traffic sign Q has a direction toward the corresponding center axis M; the direction is perpendicular to the corresponding center axis M.

In contrast, as illustrated as an example in reference character (b) of FIG. 16, the horizontal positions E1 of a traffic sign Q detected in a running road for the own vehicle 1 change depending on change of the distance between the own vehicle 1 and the traffic sign Q if there is horizontal misalignment in the radar sensor 11.

The target recognition device 13 can therefore detect horizontal misalignment of the center axis M in the radar sensor 11 and a corresponding horizontal misalignment quantity in accordance with how the horizontal positions E of the traffic sign Q change.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated as long as the remaining structure of the corresponding embodiment is capable of solving the problem. At least part of the structure of each embodiment can be added to or replaced with the structures of the other embodiments. All aspects included in the technological ideas specified by the language employed by the claims constitute embodiments of the present invention.

The present invention can be implemented by various embodiments in addition to the drive assist 10 and the target recognition device 13; the various modification include programs for running the target recognition device 13, storage media storing the programs, and axial misalignment diagnostic methods.

1 Own vehicle
10 Drive assist system
11 Radar sensor
12 Image sensor
13 Target recognition device
14 Drive assist execution device
31 CPU

The invention claimed is:

1. A diagnostic apparatus of a beam sensor installed in a vehicle, the beam sensor transmitting a probing beam and receiving a reflected beam based on the probing beam, the diagnostic apparatus comprising:

an obtaining means for obtaining horizontal misalignment information indicative of whether a horizontal misalignment exists, the horizontal misalignment being misalignment of the probing beam with respect to a designed beam axis position in a horizontal direction, the horizontal direction corresponding to a width direction of the vehicle;

a diagnostic means for diagnosing whether vertical misalignment exists, the vertical misalignment being misalignment of the probing beam with respect to the designed beam axis position in a vertical direction, the vertical direction corresponding to a height direction of the vehicle; and a determining means for:

determining, based on the horizontal misalignment information, whether the diagnostic means executes diagnosis of the vertical misalignment;

causing the diagnostic means to execute diagnosis of the vertical misalignment upon the horizontal misalignment information representing that no horizontal misalignment exists; and disabling the diagnostic means from executing diagnosis of the vertical misalignment upon the horizontal misalignment information representing that horizontal misalignment exists.

2. The diagnostic apparatus according to claim 1, wherein:

the diagnostic means is configured to detect, as a vertical misalignment quantity, a misalignment quantity of the probing beam with respect to the designed beam position in the vertical misalignment based on determining that vertical misalignment exists.

3. The diagnostic apparatus according to claim 1, further comprising:

a beam recognition means configured to repeatedly execute a first target recognition task in front of the vehicle based on a result of receiving the reflected beam by the beam sensor; and an image recognition means configured to repeatedly execute a second target recognition task based on a captured image in front of the vehicle captured by an image sensor, wherein the diagnostic means comprises:

a misalignment detection means configured to:

calculate, based on a result of the first target recognition tasks by the beam recognition means and a result of the second target recognition tasks by the image recognition means, a relationship between the number of times at least one preceding vehicle is recognized by a pair of the first and second target recognition tasks and the number of times the at least one preceding vehicle is recognized by at least the image recognition task; and detect, based on the calculated relationship, a misalignment quantity of an axis of the probing beam of the beam sensor with respect to the designed beam axis position in a vertical plane including the axis of the probing beam as the vertical misalignment quantity.

4. The diagnostic apparatus according to claim 3, wherein:

the beam recognition means comprises a beam recognition counter that counts the number of times the at least one preceding vehicle is recognized by the first target recognition tasks; and the image recognition means comprises an image recognition counter that counts the number of times the at least one preceding vehicle is recognized by the second target recognition tasks, the diagnostic apparatus further comprising:

a reset means for resetting a counted value of each of the beam recognition counter and the image recognition counter upon it being determined by the diagnostic means that the horizontal misalignment information represents that horizontal misalignment exists.

5. The diagnostic apparatus according to claim 3, wherein:

the at least one preceding vehicle includes a preceding vehicle normally recognized by the first target recognition tasks and a preceding vehicle abnormally recognized by the first target recognition tasks;

the misalignment detection means is configured to:

calculate a percentage of the sum of the number of times the at least one preceding vehicle running in front of the vehicle is recognized by the pair of the first and second target recognition tasks, the number of times the at least one preceding vehicle is abnormally recognized by the pair of the first and second target recognition tasks, and the number of times the at least one preceding vehicle is recognized by only the second target recognition tasks to the number of times the at least one preceding vehicle is recognized by the pair of the first and second target recognition tasks; and detect, based on the calculated percentage, the misalignment quantity of the axis of the probing beam of the beam sensor with respect to the designed beam axis position in the vertical plane including the axis of the probing beam as the vertical misalignment quantity.

6. The diagnostic apparatus according to claim 5, wherein:

the beam recognition means comprises:

a first counter that counts the number of times the at least one preceding vehicle is normally recognized by the pair of the first and second target recognition tasks; and a second counter that counts the number of times the at least one preceding vehicle is abnormally recognized by the pair of the first and second target recognition tasks, the image recognition means comprises a third counter that counts the number of times the at least one preceding vehicle is recognized by only the second target recognition tasks, the diagnostic apparatus further comprising:

a reset means for resetting a counted value of each of the first to third counters upon it being determined by the diagnostic means that the horizontal misalignment information represents that horizontal misalignment exists.

7. A method for detecting axial misalignment of a beam sensor installed in a vehicle, the beam sensor transmitting a probing beam and receiving a reflected beam based on the probing beam, the method comprising:

obtaining horizontal misalignment information indicative of whether a horizontal misalignment exists, the horizontal misalignment being misalignment of the probing beam with respect to a designed beam axis position in a horizontal direction, the horizontal direction corresponding to a width direction of the vehicle;

diagnosing whether vertical misalignment exists, the vertical misalignment being misalignment of the probing beam with respect to the designed beam axis position in a vertical direction, the vertical direction corresponding to a height direction of the vehicle;

determining, based on the horizontal misalignment information, whether diagnosis of the vertical misalignment is performed;

executing diagnosis of the vertical misalignment upon the horizontal misalignment information representing that no horizontal misalignment exists; and disabling diagnosis of the vertical misalignment upon the horizontal misalignment information representing that horizontal misalignment exists.

8. A system for detecting axial misalignment of a beam sensor installed in a vehicle, the beam sensor transmitting a probing beam and receiving a reflected beam based on the probing beam, the system comprising:

a central processor;

a non-transitory computer-readable storage medium; and a set of computer-executable instructions stored on the non-transitory computer-readable storage medium that cause the central processor to implement:

obtaining horizontal misalignment information indicative of whether a horizontal misalignment exists, the horizontal misalignment being misalignment of the probing beam with respect to a designed beam axis position in a horizontal direction, the horizontal direction corresponding to a width direction of the vehicle;

diagnosing whether vertical misalignment exists, the vertical misalignment being misalignment of the probing beam with respect to the designed beam axis position in a vertical direction, the vertical direction corresponding to a height direction of the vehicle;

determining, based on the horizontal misalignment information, whether diagnosis of the vertical misalignment is performed;

executing diagnosis of the vertical misalignment upon the horizontal misalignment information representing that no horizontal misalignment exists; and disabling diagnosis of the vertical misalignment upon the horizontal misalignment information representing that horizontal misalignment exists.

* * * * *